(12) United States Patent
Segler

(10) Patent No.: US 11,748,080 B2
(45) Date of Patent: Sep. 5, 2023

(54) CLOUD SERVICE DELIVERY TECHNIQUES AND SYSTEMS

(71) Applicant: SAP SE, Walldorf (DE)

(72) Inventor: Michael Segler, Wiesloch (DE)

(73) Assignee: SAP SE, Walldorf (DE)

( * ) Notice: Subject to any disclaimer, the term of this patent is extended or adjusted under 35 U.S.C. 154(b) by 81 days.

(21) Appl. No.: 17/348,109

(22) Filed: Jun. 15, 2021

(65) Prior Publication Data

US 2022/0398078 A1 Dec. 15, 2022

(51) Int. Cl.
| | |
|---|---|
| G06F 9/44 | (2018.01) |
| G06F 9/445 | (2018.01) |
| G06F 8/60 | (2018.01) |
| H04L 67/10 | (2022.01) |
| G06F 11/36 | (2006.01) |
| G06F 8/30 | (2018.01) |

(52) U.S. Cl.
CPC .............. *G06F 8/60* (2013.01); *G06F 8/30* (2013.01); *G06F 11/3688* (2013.01); *H04L 67/10* (2013.01)

(58) Field of Classification Search
CPC .......... G06F 8/30; G06F 8/60; G06F 11/3688; H04L 67/10
See application file for complete search history.

(56) References Cited

U.S. PATENT DOCUMENTS

| | | | |
|---|---|---|---|
| 8,302,108 B1 | 10/2012 | Hurren et al. | |
| 10,067,863 B1 | 9/2018 | Gandhi et al. | |
| 10,572,842 B1 | 2/2020 | To et al. | |
| 10,671,510 B1* | 6/2020 | Willson | G06F 11/3676 |
| 10,732,962 B1* | 8/2020 | Florescu | G06F 11/0706 |
| 10,855,740 B1 | 12/2020 | Ellis et al. | |
| 10,990,370 B1* | 4/2021 | Bawcom | H04L 41/0895 |
| 11,157,253 B1* | 10/2021 | Shteyman | G06F 8/71 |
| 11,188,313 B1 | 11/2021 | Huffman et al. | |
| 11,194,566 B1* | 12/2021 | Gabrielson | G06F 8/65 |
| 11,200,157 B1* | 12/2021 | Mathew | G06F 11/3688 |
| 11,494,285 B1* | 11/2022 | Manthey | G06F 11/3616 |
| 11,522,747 B1 | 12/2022 | Segler | |
| 11,544,048 B1* | 1/2023 | Ravindran | G06F 8/60 |
| 2017/0034023 A1 | 2/2017 | Nickolov | H04L 43/0817 |
| 2017/0063615 A1* | 3/2017 | Yang | H04L 67/62 |

(Continued)

OTHER PUBLICATIONS

Pantazis Deligiannis, Building Reliable Cloud Services Using P# (Experience Report), 2020, pp. 1-16. https://arxiv.org/pdf/2002.04903.pdf (Year: 2020).*

(Continued)

*Primary Examiner* — Mongbao Nguyen
(74) *Attorney, Agent, or Firm* — SCHWEGMAN LUNDBERG & WOESSNER, P.A.

(57) ABSTRACT

A cloud service provider system may receive a commit instruction including a modified build of the software service. The cloud service provider system may use the modified build to perform at least one test of a first operations feature of the software service at an operations stage. Responsive to the at least one test, the cloud service provider system sets a feature toggle for the first operations feature to enable the change to the operations code of the software service. An applications test stage is executed to test the modified build using the first operations feature.

20 Claims, 13 Drawing Sheets

(56) References Cited

U.S. PATENT DOCUMENTS

| | | | |
|---|---|---|---|
| 2018/0173510 A1* | 6/2018 | Koshkin | G06Q 10/06313 |
| 2018/0322037 A1 | 11/2018 | Thazhathekalam et al. | |
| 2019/0065179 A1 | 2/2019 | Novak et al. | |
| 2019/0294531 A1* | 9/2019 | Avisror | G06F 11/3664 |
| 2020/0012954 A1 | 1/2020 | Botea et al. | |
| 2020/0023862 A1 | 1/2020 | Rodriguez Bravo et al. | |
| 2020/0076538 A1 | 3/2020 | Soultan et al. | |
| 2020/0125353 A1* | 4/2020 | Bean | G06F 8/65 |
| 2020/0184278 A1 | 6/2020 | Zadeh et al. | |
| 2020/0228414 A1 | 7/2020 | Garty et al. | |
| 2020/0371901 A1 | 11/2020 | Sastry | |
| 2021/0064635 A1 | 3/2021 | Tommasi et al. | |
| 2021/0067422 A1 | 3/2021 | Stavisski et al. | |
| 2021/0067607 A1 | 3/2021 | Gardner et al. | |
| 2021/0084536 A1 | 3/2021 | Chou et al. | |
| 2021/0111942 A1 | 4/2021 | Tahhan et al. | |
| 2021/0127351 A1 | 4/2021 | Stojanovski | |
| 2021/0203567 A1 | 7/2021 | Hoopes et al. | |
| 2021/0208971 A1 | 7/2021 | Srinivasan | |
| 2021/0248058 A1* | 8/2021 | Hattingh | G06F 9/45558 |
| 2021/0248514 A1 | 8/2021 | Cella et al. | |
| 2021/0311860 A1 | 10/2021 | Botea et al. | |
| 2021/0320836 A1 | 10/2021 | Leibkowiz et al. | |
| 2021/0342139 A1 | 11/2021 | Verma et al. | |
| 2021/0373860 A1 | 12/2021 | Khan | |
| 2021/0406073 A1* | 12/2021 | Pavlov | G06F 9/45558 |
| 2022/0086669 A1 | 3/2022 | Yao et al. | |
| 2022/0350670 A1* | 11/2022 | Magana Perdomo | G06F 11/2092 |
| 2022/0398333 A1 | 12/2022 | Segler | |
| 2022/0400047 A1 | 12/2022 | Segler | |

OTHER PUBLICATIONS

Mikael Vesavuori, DevOps: Commit, build and deploy your code, 2020, pp. 1-34. https://medium.com/wearehumblebee/devops-commit-build-and-deploy-your-code-1d30c8f20a13 (Year: 2020).*

Nitin Verma, Complete CI/CD with AWS CodeCommit, AWS CodeBuild, AWS CodeDeploy, and AWS CodePipeline, 2020, pp. 1-12. https://aws.amazon.com/blogs/devops/complete-ci-cd-with-aws-codecommit-aws-codebuild-aws-codedeploy-and-aws-codepipeline/ (Year: 2020).*

"U.S. Appl. No. 17/342,700, Non Final Office Action dated Apr. 6, 2022", 7 pgs.

"U.S. Appl. No. 17/342,700, Examiner Interview Summary dated Jul. 13, 2022", 3 pgs.

"U.S. Appl. No. 17/342,700, Notice of Allowance dated Jul. 25, 2022", 5 pgs.

"U.S. Appl. No. 17/342,700, Response filed Jul. 6, 2022 to Non Final Office Action dated Apr. 6, 2022", 13 pgs.

"U.S. Appl. No. 17/348,208, Non Final Office Action dated Jul. 12, 2022", 10 pgs.

U.S. Appl. No. 17/348,208, filed Jun. 15, 2021, Cloud Service Delivery Techniques and Systems.

U.S. Appl. No. 17/342,700, filed Jun. 9, 2021, Cloud Service Outage Reporting.

"U.S. Appl. No. 17/342,700, Notice of Allowability dated Nov. 10, 2022", 2 pgs.

"U.S. Appl. No. 17/348,208, Notice of Allowance dated Feb. 1, 2023", 8 pgs.

"U.S. Appl. No. 17/348,208, Notice of Allowance dated Nov. 3, 2022", 7 pgs.

"U.S. Appl. No. 17/348,208, Response filed Oct. 11, 22 to to Non Final Office Action dated Jul. 12, 2022", 11 pgs.

* cited by examiner

US 11,748,080 B2

CLOUD SERVICE DELIVERY TECHNIQUES AND SYSTEMS

BACKGROUND

Traditionally, software has been self-contained and executed on one or more local machines. An enterprise desiring to use a software tool builds an on-site computing system and executes the software tool on that computing system. The software tool may be developed by the enterprise and/or purchased from a third-party software provider. The user accesses the software tool directly from the computing system or remotely via a networked user computing device.

In this arrangement, the enterprise using the software tool is responsible for infrastructure, platform, and application-level management. For example, the enterprise is responsible for purchasing, setting up, and maintaining any servers, network hardware, etc., for the on-site computing system. The enterprise is also responsible for platform maintenance including operating systems, middleware, etc. The enterprise may also have responsibility for the software tool itself at the application level.

BRIEF DESCRIPTION OF DRAWINGS

The present disclosure is illustrated by way of example and not limitation in the following figures.

DETAILED DESCRIPTION

Figure 1:
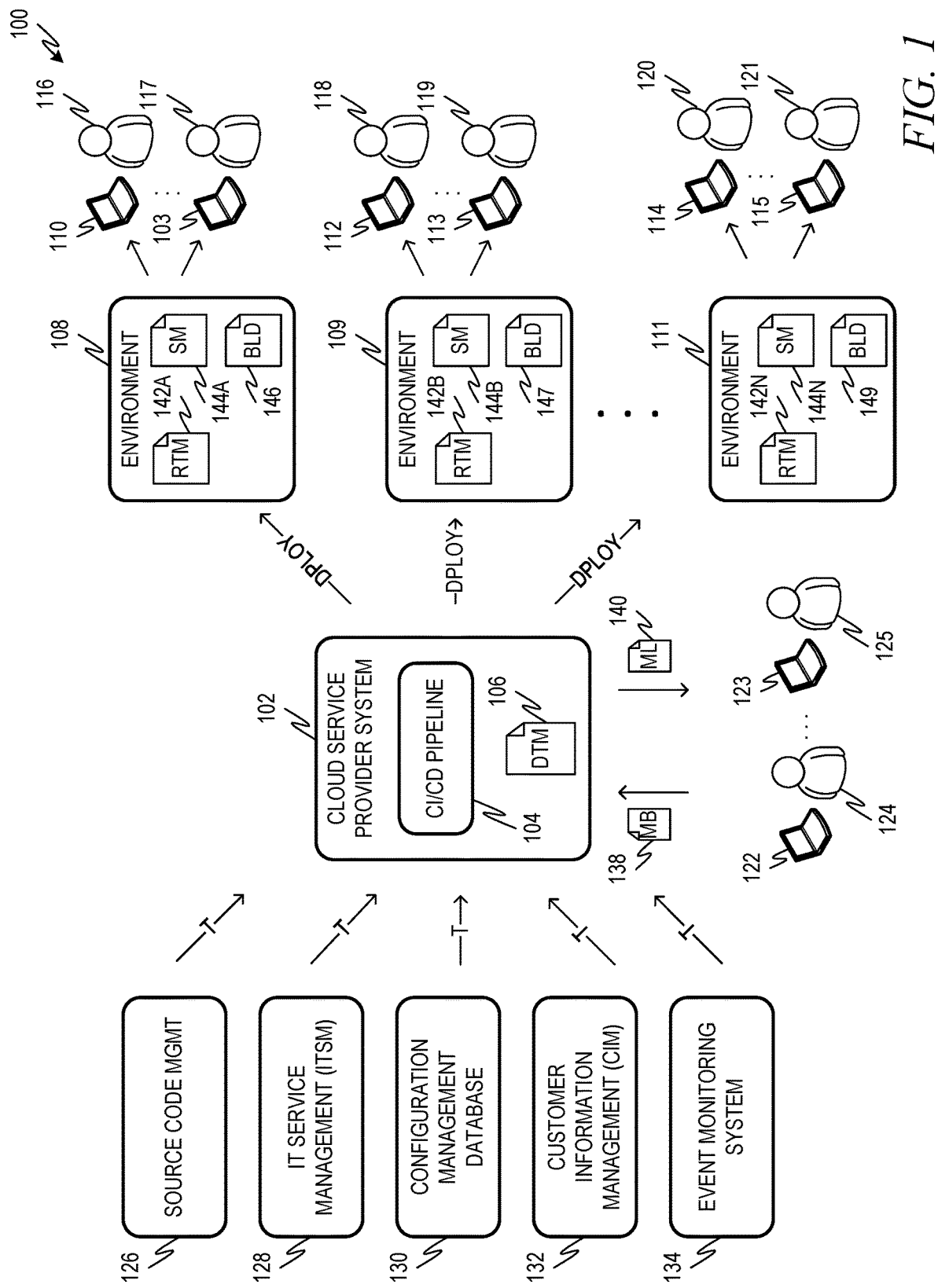
FIG. 1 is a diagram showing one example of an environment for implementing operation code changes to software service, such as a cloud service, utilizing a CI/CD pipeline.

In various examples, software is delivered as a cloud service. In a cloud service delivery arrangement, a software provider, referred to herein as a cloud service provider, delivers software functionality directly to consumer systems via the Internet or another suitable network. Particulars of the provisioning are handled remotely by the cloud service provider. Consider three example arrangements for cloud service delivery, Infrastructure as a Service (IaaS), Platform as a Service (PaaS), and Software as a Service (SaaS). According to IaaS, a cloud service provider serves consumer systems with virtual, scalable infrastructure such as, for example, virtual servers, virtual networking, virtual databases or other stores, and the like. For example, an IaaS cloud service provider may implement virtualization technology to provide customers with a virtual data center including one or more virtual machines acting as virtual servers. Consumer systems may utilize an IaaS service to replace some or all of a customer-maintained data center. In some examples, an IaaS customer is responsible for features such as the applications, runtime, operating systems, middleware, and data executed on and processed by the IaaS virtual infrastructure.

According to PaaS, the cloud service provider serves a framework that developers at a PaaS customer may use to develop applications, such as user-level applications, that are provided to consumer systems. The PaaS cloud service provider generates a scalable infrastructure and platform components for the applications such as operating systems, middleware, and runtimes. In some examples, the PaaS customer is responsible for developing an application and managing data, with the cloud service provider responsible for the OS, middleware and runtimes as well as infrastructure, which may be provided by directly by the PaaS cloud service provider or purchased from a separate IaaS cloud service provider.

According to SaaS, the cloud service provider generates an, often scalable, software application that is provided to the consumer systems via the Internet or another suitable network. The SaaS cloud service provider system manages infrastructure, platform, application, and data management, either directly or via another PaaS and/or IaaS cloud service provider. Accordingly, the SaaS customer may not need to manage these aspects.

Consumer systems that consume software services may include user computing devices by which various users consume a provided software service. In some examples, the user computing devices are associated with a customer of the software service. Consider an example in which the software service is an accounting solution. The customer may be an enterprise that purchases the software service (e.g., from the cloud service provider system). Users associated with the customer may be employees or other individuals who access and/or use the accounting solution on behalf of the customer. Consider another example in which a customer consumes a lower-level software service (e.g., IaaS or PaaS cloud service) to provide a higher level service to its own customers (e.g., a PaaS or SaaS cloud service). In this example, users associated with a customer may be users who consume a second software service provided by the customer, where the second software service uses or otherwise depends on a first software service provided by the cloud service provider system.

In various examples, cloud services, such as IaaS, PaaS, and SaaS services, are provided using an environment structure. In an environment structure, the cloud service provider maintains one or more environments. The environments may be or include one or more data centers including one or more virtual and/or hardware services. The cloud service executes at the environments. Consumer systems, such as users associated with various customers, access the cloud service by accessing the environments.

In various examples, a cloud service provider utilizes a continuous integration/continuous delivery (CI/CD) pipeline to generate and deploy changes to a cloud service. According to CI/CD pipeline, the cloud service provider maintains an integrated source of a cloud service, called a mainline. The mainline is installed at the various environments, for example, according to customer allocation at the environments. When it is desirable to make a change to the cloud service, a developer system associated with the cloud service provider checks out a version of the mainline from a source code management (SCM) system into a local developer repository. The developer builds and tests a desired change to the mainline. When the developer's modified build is finished and tested, the developer commits the modified build to the CI/CD pipeline. The CI/CD pipeline executes an additional series of integration and acceptance tests to generate a new build including the developer's modification. Upon passing integration and acceptance testing, the new software service build is deployed to the various environments.

A software service build may include application code and operational code. The application code is executable to provide user-facing functionality such as cloud service features, user interfaces, etc. Consider an example SaaS cloud service that provides customers with an accounting solution. Application code may provide, for example, various interfaces for entering or importing transaction data, features for providing various accounting reports, etc. Consider another example SaaS cloud service that provides customers with a human resources management application. Application code may provide, for example, various interfaces for entering or importing human resource data, various interfaces for generating reports or otherwise managing benefits, compensation, or other human resource-related features.

The operations code is executable to provide underlying functionality to support application code. For example, operations code can manage deployment, provisioning, scaling, and the like of a software service build. Deployment can include the deploying of stored procedures to one or more environments for access by customer users. Scaling may include determining a data storage or runtime capacity needed for a customer and the customer's users at a particular environment. Provisioning may include changing the amount of data storage or runtime capacity available to a customer's users at an environment and, when desirable, provisioning a new environment or de-provisioning an existing environment.

Operations code may also manage the infrastructure for executing the cloud service. For example, operations code may include application runtimes for managing one or more virtual machines (VMs) that execute some or all of the cloud service mainline. In some examples, operations code may determine whether a particular data processing will be performed by the runtime of a database management system or another runtime. In examples in which a cloud service is implemented using a Kubernetes cluster, operations code may mange the Kubernetes cluster including, for example, the configuration of a Kubernetes pod of containers, the configuration of a load balancer for directing traffic to different containers of the Kubernetes pod, etc.

In some examples, the operations code for a software service build is used in the execution of the CI/CD pipeline itself. For example, when a software service build for new application code is implemented using the CI/CD pipeline, operations code may be executed during integration, acceptance, and/or other stages. As a result, errors in operations code may adversely affect not only the build under test, but also the CI/CD pipeline itself. For example, erroneous operations code may cause the destruction of internal CI/CD pipeline test environments in the CI/CD pipeline itself or in the data of tested builds.

Consider an example in which operations code is executable to manage database scaling for a software service build. If the operations code erroneously determines that a database should be scaled down, it may implement the scale down by deleting customer data in the CI/CD pipeline. This may prevent the CI/CD pipeline from processing additional build changes until the scaling code is corrected and the deleted customer data restored.

Consider another example in which portions of the CI/CD pipeline are executed using one or more Kubernetes clusters, where the Kubernetes clusters and supporting code are operations code. If an erroneous configuration of the Kubernetes cluster occurs during execution of the CI/CD pipeline, it may damage the Kubernetes cluster and the CI/CD pipeline. The damaged Kubernetes cluster may be rolled back to a previous configuration. If any new applications features depend on the damaged Kubernetes cluster configuration, however, further use of the pipeline to test those new applications features may be stalled until the error is corrected and the Kubernetes cluster rebuilt according to the new configuration.

Consider another example in which operations code is used to monitor configurations of a software service build. If the operations code fails to properly monitor the build and/or applies incorrect or sub-optimal thresholds for alerting, the CI/CD pipeline may fail without alerting the cloud service provider.

It may be desirable to avoid damage to the CI/CD pipeline and associated errors and/or downtime. For example, if a cloud service customer experiences an error or desires a new feature while the CI/CD pipeline is down, the cloud service provider's ability to respond may be limited or even eliminated until the CI/CD pipeline is repaired.

One way to avoid this damage is to use the CI/CD pipeline for application code while testing and integrating operations code separately. In this way, any errors in the operations code can be detected and remedied before the operations code is used to implement the CI/CD pipeline for application code changes. Testing and integrating operations code separate from application code, however, creates additional complications for the cloud service provider. For example, it may have the cloud service provider implement and maintain a parallel infrastructure for testing and integrating operations code.

Testing and integrating operations code separate from application code may also involve the creation and maintenance of a parallel trigger structure for making changes to a software service build. For example, triggers prompting application-related changes to the cloud service may prompt cloud service provider developers to generate new builds and commit the new builds using a CI/CD pipeline, as described herein. On the other hand, triggers prompting changes to operations code may be handled outside of the CI/CD pipeline.

Various examples address these and other challenges by incorporating the handling of operations triggers and application triggers into a CI/CD pipeline. Operations triggers prompting a change to an operations feature of the cloud service may be processed according to the CI/CD pipeline. For example, an operations trigger may include a requested change to the scaling, provisioning, deployment, or the like. A developer, using a developer system, checks-out the mainline for the relevant cloud service and makes changes to the operations code to generate a modified software service build that implements the requested change to at least one operations feature of the service. The modified software service build is committed using the CI/CD pipeline.

Upon commit, the CI/CD pipeline executes an operations stage to perform at least one test of the operations code of the modified cloud services build. In some examples, the test includes at least one test of the changed operations feature. Provided that the modified cloud services build passes the at least one test, the operations stage sets a feature toggle for the at least one operational feature to activate the change to the at least one operations feature for the CI/CD pipeline. When the at least one operations feature is activated, subsequent modifications to application code of the cloud service will be integrated and/or accepted using the modified operations feature. In this way, operations code triggers are handled using the CI/CD pipeline while minimizing the risk that a modified build with new operations code will crash the CI/CD pipeline.

In some examples, handling operations triggers and application triggers using the CI/CD pipeline increases the number and complexity of deployments performed using the CI/CD pipeline. For example, a CI/CD pipeline handling application code only may deploy a new software service build when there is a change to an application feature, such as a customer-facing interface or feature. A CI/CD pipeline handling application and operations triggers may deploy a new software service build when there is a change to scaling, deployment, and/or customer lifecycle factors. Considering that a deployment may be executed across multiple environments, the resources consumed for each deploy man be substantial.

In various examples, a cloud service provider system addresses these and other challenges by utilizing a delta mode deploy. According to a delta mode deploy, the cloud service provider deploys a new or modified build by executing the portions of a build deployment that are needed at each environment. Portions of the build deployment that are not needed at a given environment are not executed.

The cloud service provider system may determine which portions of a build deployment are needed at a particular environment utilizing various manifests for the cloud service and for the various environments. For example, the cloud service provider system may maintain a design time manifest for a cloud service. The design time manifest sets forth various parameters of the cloud service including sizing rules, scaling rules, configuration templates, and prerequisites.

Each individual environment may be described by a subscription manifest and a runtime manifest. The subscription manifest for an environment describes the aggregate sales parameters of all customers operating in the environment. Accordingly, the subscription manifest may describe the actual load on the environment that is anticipated based on the customers who are using the environment to access the cloud service. The subscription manifest may also include an appropriate scaling level for the environment, appropriate sizing factors for the environment based on the customers' actual or anticipated peak loads. The runtime manifest for an environment describes the sizing of an environment for the customers using the environment.

According to a delta deploy, the cloud service provider system utilizes the various manifests to determine the current deployment status of an environment as well as the target deployment status upon deployment of a new or modified software service build. The cloud service provider system then executes only portions of a deploy that are needed. For example, the cloud service provider system may determine if a new or modified software service build includes a change to operations code. If such a change to operations code is not included, the cloud service provider system may omit a deployment routine for deploying operations code. In another example, the cloud service provider system uses the various manifests, as described herein, to determine if the new or modified software service build causes a particular environment to change its provisioning or scaling. If no such change to scaling or provisioning will occur at an environment, the cloud service provider may omit a portion of the deployment that calculates provisioning or scaling.

Executing the deploy portions of a CI/CD pipeline using a delta mode deploy may minimize the resources needed for each individual deploy at various environments, which may increase the feasibility of considering operations triggers as well as applications triggers using the CI/CD pipeline, as described herein.

FIG. 1 is a diagram showing one example of an environment 100 for implementing operation code changes to software service, such as a cloud service, utilizing a CI/CD pipeline. The environment 100 comprises a cloud service provider system 102 and various environments 108, 109, 111. The cloud service provider system 102 may be or include one or more computing devices, such as servers, that may be implemented by the cloud service provider and/or executed remotely.

Environments 108, 109, 111 execute software service builds 146, 147, 149. Software service builds 146, 147, 149 are deployed at the environments 108, 109, 111 to provide a software service, such as a cloud service, to one or more users 116, 117, 118, 119, 120, 121. The software service may be any suitable software service such as, for example, an IaaS, PaaS, and/or SaaS cloud service. In some examples, the software service is an SaaS cloud service providing an application to the users such as, for example, an accounting application, a human resources management application, a supply chain management application, etc.

Environments 108, 109, 111 may include one or more computing devices, such as servers, for executing the software service builds 146, 147, 149. In some examples, environments 108, 109, 111 are implemented at geographic locations near to their respective users 116, 117, 118, 119, 120, 121 so as to minimize network latencies as the users 116, 117, 118, 119, 120, 121 access the software service. For example, environment 108 may be implemented at a data center or data centers geographically near to the users 116, 117, environment 109 may be implemented at a data center or data centers geographically near to users 118, 119, environment 111 may be implemented at a data center or data centers geographically near to the users 120, 121, and so on.

The software service builds 146, 147, 149 may be deployed in any suitable manner. In some examples, the respective environments 108, 109, 111 implement one or more Virtual Machines (VMs). The software service builds 146, 147, 149 may comprise one or more containers that execute at the VMs to provide the software service. In some examples, VMs executed at the environments 108, 109, 111 are arranged as Kubernetes clusters with one or more containers of the software service builds 146, 147, 149 executing at one or more of the Kubernetes clusters.

Users 116, 117, 118, 119, 120, 121 consume the software service utilizing one or more user computing devices 110, 103, 112, 113, 114, 115 that access the respective environments 108, 109, 111 utilizing a network, such as a Local Area Network (LAN), a Wide Area Network (WAN), etc. The user computing device 110, 103, 112, 113, 114, 115 may be consumer systems that consume the software service provided by the software service builds 146, 147, 149. The user computing devices 110, 103, 112, 113, 114, 115 may be or include any sort of user computing device including, for example, a desktop computer, a laptop computer, a tablet computer, other mobile computing device, and the like.

Each user 116, 117, 118, 119, 120, 121 is associated with a customer, where the customer is an entity that receives access to the software service for its users. For example, a customer may be a business or other enterprise. The customer's users may include employees, contractors, or others who are authorized to access and use the software service on behalf of the customer. Customers may be operated out of one or more of the environments 108, 109, 111. A customer is operated out of an environment 108, 109, 111 when the customer's users 116, 117, 118, 119, 120, 121 access the software service via that environment 108, 109, 111. For example, if a first customer and a second customer are operated out of the environment 108, then a portion of the users 116, 117 of the environment 108 may be associated with the first customer and another portion of the users 116, 117 of the environment 108 may be associated with the second customer. (It will be appreciated that some environments 108, 109, 111 may provide software services to users from more than two customers.) The various environments 108, 109, 111 may be arranged to manage computing resources to adequately serve the users 116, 117, 118, 119, 120, 121 of customers operated out of a particular environment 108, 109, 111.

As described herein, the software service builds 146, 147, 149 include applications code for providing user-facing application features and operations code for providing one or more operations features. Consider again the example in which the software service provides an accounting solution. Applications code of the software service build 146 may execute to provide user-facing features of the accounting solution to the users 116, 117. For example, applications code may provide various user interfaces, various searches or queries for purchase orders, invoices, and the like, various tools for generating invoices, purchase orders, and so on. Consider another example in which the software service provides a human resources management solution. Example application features may include various interfaces for querying employee information, various interfaces for entering or providing employee information, etc.

Operations code of the software service builds 146, 147, 149 provides various operations features. For example, a deployment feature may manage the deployment of the software service build 146, 147, 149 to an environment 108, 109, 111. In some examples, a deployment feature may also manage the configuration of an environment 108, 109, 111 to execute a software service build 146, 147, 149. For example, in an arrangement where the environments 108, 109, 111 implement Kubernetes clusters or other arrangements of VMs, the deployment feature may arrange the Kubernetes cluster or other arrangement of VMs to execute one or more containers of the software service build 146, 147, 149.

Operations code, in some examples, also provides a scaling feature. A scaling feature monitors the computing resources consumed by users of various customers at the environments 108, 109, 111. The consumed computing resources may include runtime capacity, data storage capacity, etc. The scaling operation may determine if there is sufficient capacity for the customers operated from an environment 108, 109, 111. If there is not sufficient capacity, the scaling feature may call a provisioning feature to provision a new environment and/or de-provision an existing environment. (In some examples, the provisioning feature is also implemented by operations code of the software service build 146, 147, 149.)

Another example operations feature is a customer onboarding feature. According to a customer onboarding feature, one or more environments 108, 109, 111 is configured to provide the software service to users 116, 117, 118, 119, 120, 121 of a new customer. This may include, for example, configuring one or more of the environments 108, 109, 111 to execute additional containers or other runtimes to provide the service to the users of the new customer. (Some customers may be handled from more than one environment 108, 109, 111.) The customer onboarding feature, in some examples, calls the scaling feature and/or the provisioning feature to ensure that the new customer will have sufficient computing resources at the environment or environments from which the new customer will be operated and, if necessary, to provision a new environment. In some examples, the customer onboarding may also execute when a customer leaves or deactivates its use of the software service to re-scale the affected environment or environments 108, 109, 111 and, if necessary, de-provision one or more environments 108, 109, 111. Other example operations features include various monitoring metrics used in implementing the CI/CD pipeline 104, various recommended and/or automated actions implemented in case of monitoring threshold violations during operation of the CI/CD pipeline 104, various data restoration procedures, various recovery procedures for disaster management, features for moving or copying an environment 108, 109, 111, customer or tenant move and copy procedures, and the like.

Figure 2:
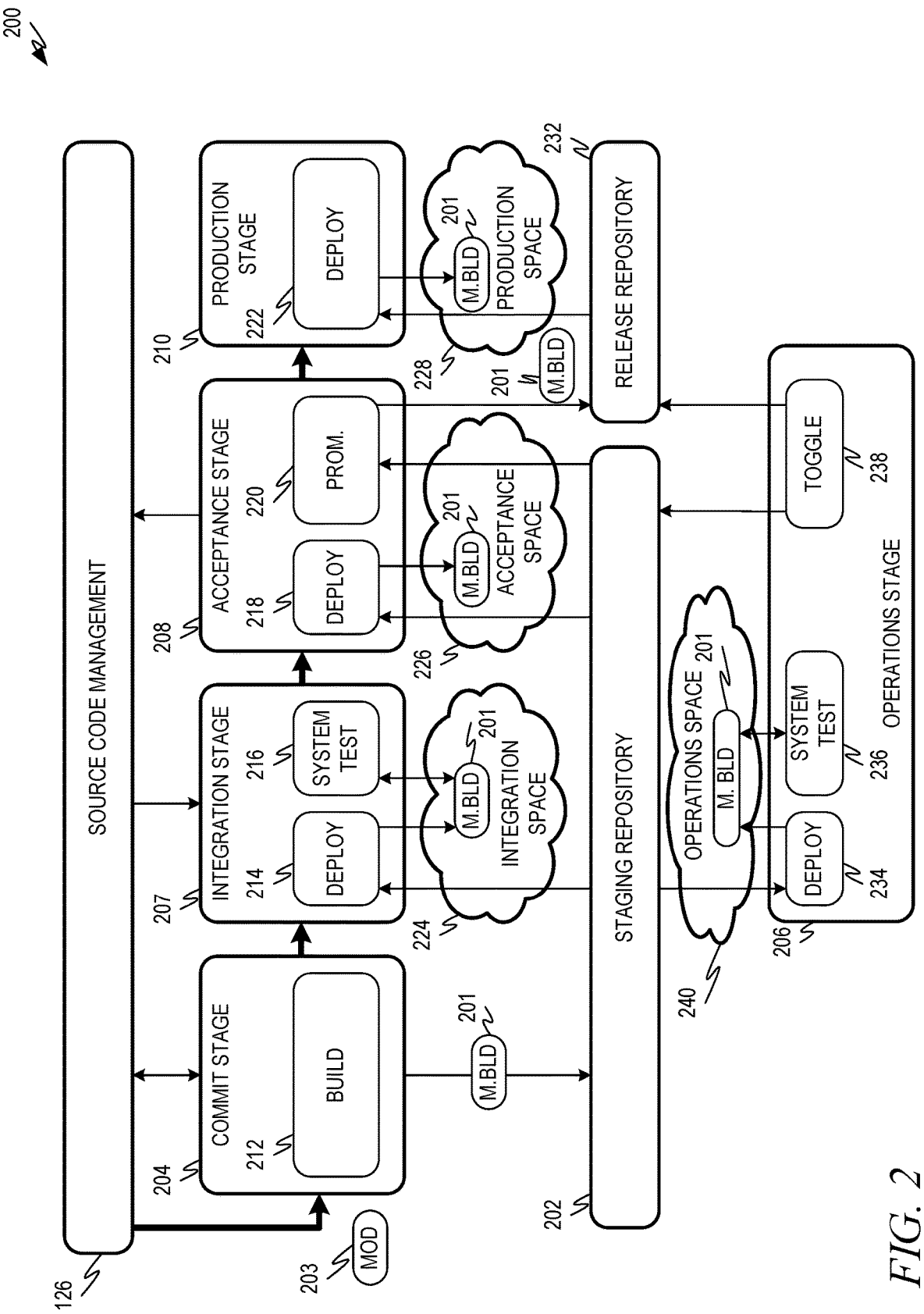
FIG. 2 is a diagram showing one example of a CI/CD pipeline.

The software service builds 146, 147, 149 are generated using a cloud service provider system 102. The cloud service provider system 102 comprises a CI/CD pipeline 104 for generating the software service builds 146, 147, 149. The CI/CD pipeline 104 may comprise components for implementing application code and operations code. For example, additional details of the CI/CD pipeline 104 are shown at FIG. 2 below. Also, although the CI/CD pipeline 104 is shown at the cloud service provider system 102, it will be appreciated that some portions of the CI/CD pipeline 104 may be implemented at the respective environments 108, 109, 111. For example, certain deployment, scaling, provisioning, and other aspects of the CI/CD pipeline 104 may be implemented at the respective environments 108, 109, 111 as described herein.

The cloud service provider system 102 is in communication with one or more developer users 124, 125 (also referred to as developers 124, 125) via one or more developer computing devices 122, 123. The developer computing devices 122, 123 may be similar to the user computing devices 110, 103, 112, 113, 114, 115 described herein. Developer users 124, 125 may check out a mainline 140 of the software service build. The developer user 124, 125 makes changes to the mainline 140, for example, to respond to a trigger. The developer commits a modified build 138, including the changes, to the cloud service provider system 102. The CI/CD pipeline 104 operates on the modified build 138 to perform various testing and integration on the modified build 138. Provided that the testing is successful, the modified build 138 is deployed to the environments 108, 109, 111, for example, as a replacement for a previous software service build 146, 147, 149.

The cloud service provider system 102 may maintain a design time manifest 106 for the software service. The design time manifest 106 describes various aspects relating to operations features of the software service. For example, the design time manifest 106 may comprise sizing rules, scaling rules, configurations templates, and prerequisites.

Sizing rules describe how sales parameters influence the sizing of each consumed service. Sales parameters describe the way that various customers utilize the software service. For example, a customer's sales parameters may include the number of the customer's users who access the service, a number and/or size of records used by the customer. Consider again the example in which the software service provides an accounting solution. An example sizing rule for the software service may include an amount of data storage at an environment required per customer accounting record. In various examples, the environment 108, 109, 111 has a maximum and a minimum sizing, such that if the sum of the sizing of a software service consumed by all customers operated out of the environment 108, 109, 111 exceeds the maximum sizing, then a new environment 108, 109, 111 may need to be provisioned.

Scaling rules may determine how the scaling level for the computing resources assigned to a customer for software service changes with scaling requests. For example, scaling rules may set forth an amount of storage, runtime capacity, etc. to be added or subtracted from a customer in response to a positive or negative scaling request. A positive scaling request may be a request for additional computing resources for a customer using the software service. A negative scaling request may be a request for fewer computing resources for a customer using the software service.

The design time manifest may also include configuration templates that include collections of fixed configuration parameters for the software service. Examples of fixed configuration parameters include scaling rules and/or formulas, scaling increments, compatible versions of consumed services, a number of customers per environment type (e.g., test environment, trial environment, productive environment), monitoring thresholds, and the like. Prerequisite data may describe the version of services consumed by the software service as well as data (e.g., central script versions) that describe a repository where the consumed services are located. For example, a software service that is an SaaS service may consume a PaaS service and/or an IaaS service. Similarly, a PaaS service may consume an IaaS service.

Each environment 108, 109, 111 may also maintain environment-specific runtime manifests 142A, 142B, 142N and subscription manifests 144A, 144B, 144N describing the software service at the respective environments 108, 109, 111. The subscription manifest for an environment 108, 109, 111 comprises data about the customers who are being operated out of the environment 108, 109, 111 including, for example, aggregate sales parameters for all customers operated in the environment 108, 109, 111. The subscription manifests 144A, 144B, 144N may also include an indication of the scaling level for the various customers operated from the environment 108, 109, 111, for example, based on scaling requests and sales parameters for the customer or customers operated from the environment 108, 109, 111. The subscription manifest 144A, 144B, 144N, in some examples, also includes sizing factors related to peak load requests from customers as well as assumed aggregate sales parameters for an initial setup of the environment 108, 109, 111.

The runtime manifests 142A, 142B, 142N indicate the sizing parameters for the respective environments 108, 109, 111 determined in accordance with the subscription manifest 144A, 144B, 144N. For example, the runtime manifests 142A, 142B, 142N may indicate the computing resources being used and/or ready for use at the respective environments 108, 109, 111 at any given time in view of the subscription data provided at the subscription manifests 144A, 144B, 144N. In various examples, configuring the subscription manifest 144A, 144B, 144N and/or configuring the runtime manifest 142A, 142B, 142N for an environment 108, 109, 111 is an operations feature handled by operations code of the respective software service builds 146, 147, 149.

Changes to a software service build 146, 147, 149 can be initiated by various triggers. Triggers can be generated by various different systems including, for example, a source code management system 126, an Information Technology Service Management (ITSM) 128, a configuration management database system 130, a customer information management (CIM) system 132, and an event monitoring system 134.

Application triggers can be generated by the source code management system 126. For example, the source code management system 126 may generate a trigger when a request is received for a new application feature at the software service and/or for a modification or repair to an existing application feature of the software service. An application trigger may be generated by the source code management system 126, for example, upon request from a customer, upon request by a developer, upon request by a manager, etc.

The ITSM 128 generates an operations trigger, where an operations trigger is a trigger requesting a change to operations code of the software service build 146. The ITSM 128 may generate a trigger, for example, based on a ticket generated by a user 116, 117 118, 119, 120, 121 or other person based on an error or problem encountered by the user while consuming the software service. For example, if a user 116, 117 118, 119, 120, 121 or threshold portion of the users 116, 117 118, 119, 120, 121 at an environment 108, 109, 111 submit tickets indicating sluggish performance of the software service build 146, 147, 149, the ITSM 128 may generate an operations trigger requesting changes to the operations code to address the issue. The trigger may indicate a requested change to the operations code and/or report the problem and allow the cloud service provider system 102 and/or developer 124, 125 to determine the change to be made.

A customer information management (CIM) system 132 may also generate an operation trigger. For example, the CIM system 132 may store customer parameters describing various customers including, for example, customer load, customer historic sales figures, etc. The CIM system 132 may generated an operations trigger, for example, if the behavior of the customer indicates that a change to the operations code of the software service build 146, 147, 149 is desirable. For example, consider again the example of where the software service provides an accounting solution. The CIM system 132 may determine that the number of invoices for a customer is increasing. It may generate an operations trigger to modify a scaling factor for the software service to ensure that the environment 108, 109, 111 operating the customer can handle the increased load. Also, in some examples, the CIM system 132 may determine that a customer experiences a peak load of sales at a particular time of year (e.g., around Christmas). The CIM system 132 may generate an operations trigger requesting a scaling rule or similar change to make sure that the environment 108, 109, 111 operating the customer has sufficient capacity to handle the peak load when it occurs.

The event monitoring system 134 monitors events that occur at the environments 108, 109, 111 including, for example, errors and exceptions. Upon receiving an event, the event monitoring system 134 may determine that the event should be remedied by a change to the operations code of the software service build 146, 147, 149. For example, an error or exception due to exceeding the capacity of computing resources at one or more of the environments 108, 109, 111 may be addressed by changing the provisioning, deployment, and/or scaling of the software service. The event monitoring system 134 may generate an operations trigger requesting a specific change and/or informing the cloud service provider system 102 of one or more errors or exceptions such that the cloud service provider system 102 selects a particular operations code change to address the issue.

FIG. 2 is a diagram showing one example of a CI/CD pipeline 200. For example, the CI/CD pipeline 200 shows one example implementation of the CI/CD pipeline 104 of FIG. 1. The CI/CD pipeline 200 is initiated when a developer, such as one of developers 124, 125, submits a build modification 203 to the commit stage 204. The build modification 203 may include a modified version of the mainline build previously downloaded by the developer 124, 125.

The commit stage 204 executes a build operation 212 to create and/or refine the modified software service build 201. For example, the mainline may have changed since the time that the developer 124, 125 downloaded the mainline version used to create the modification 203. The modified software service build 201 generated by build operation 212 includes the changes implemented by the modification 203 as well as any intervening changes to the mainline. The build operation 212 and/or commit stage 204 stores the modified software service build 201 to a staging repository 202 where it can be accessed by various other stages of the pipeline 200.

In some examples, the modified software service build 201 is generated with feature toggles. A feature toggle is a property of a software build that selectively enables or disables a feature or features. Feature toggles may be configured to selectively enable or disable application features and/or operations features. Feature toggles can be implemented in any suitable manner such as, in some examples, in applications code and/or operations code itself. In some examples, feature toggles can be implemented by including multiple versions of the operations and/or applications code for implementing a given feature. The feature toggle may be a portion of code that determines which version of the feature code is executed at runtime.

In some examples, the build operation 212 determines whether a modified software service build 201 includes changes to operations code relative to a previous version of the modified software service build 201. For example, a change to feature code can be determined if the modified software service build 201 was generated in response to an operations trigger. Also, in some examples, the build operation 212 examines the modified software service build 201 relative to a previous version to determine whether there have been any changes to operations code. If the modified software service build 201 includes changes to operations code, the build operation 212 may initially configure the modified software service build 201 with any modified operations features toggled off. In some examples, the developer 124, 125 generates the modifications 203 with operations features toggled off.

If the modified software service build 201 includes changes to operations code, an operations stage 206 receives the modified software service build 201 from the staging repository 202. An operations deploy function 234 receives the modified software service build 201 and deploys the modified software service build 201 to an operations space 240. The operations space 240 is a test environment to which the modified software service build 201 can be deployed for testing. A system test function 236 executes various tests on the modified software service build 201 installed at the operations space 240. If the modified software service build 201 fails one or more of the tests, the modified software service build 201 may be sent back to the developer for corrections. If the modified software service build 201 passes the tests administered by the system test function 236, a toggle function 238 executes to modify one or more feature toggles of the modified software service build 201 to enable operations features modified in the modified software service build 201.

If the modified software service build 201 does not include any changes to operations features and/or after the modified software service build 201 is processed by the operations stage 206, an integration stage 207 receives the modified software service build 201 for further testing. A deploy function 214 of the integration stage 207 deploys the modified software service build 201 to an integration space 224. The integration space 224 is a test environment to which the modified software service build 201 can be deployed for testing. While the modified software service build 201 is deployed at the integration space 224, a system test function 216 performs one or more integration tests on the modified software service build 201. If the modified software service build 201 fails one or more of the tests, it may be returned to the developer 124, 125 for correction. If the modified software service build 201 passes testing, the integration stage 207 provides an indication indicating the passed testing to an acceptance stage 208.

The acceptance stage 208 uses a deploy function 218 to deploy the modified software service build 201 to an acceptance space 226. The acceptance space 226 is a test environment to which the modified software service build 201 can be deployed for testing. While the modified software service build 201 is deployed at the acceptance space 226, a promotion function 220 applies one or more promotion tests to determine whether the modified software service build 201 is suitable for deployment to a production environment. Example acceptance tests that may be applied by the promotion function 220 include Newman tests, UiVeri5 tests, Gauge BDD tests, various security tests, etc. If the modified software service build 201 fails the testing, it may be returned to the developer 124, 125 for correction. If the modified software service build 201 passes the testing, the promotion function 220 may write the modified software service build 201 to a release repository 232, from which it may be deployed to production environments.

The example of FIG. 2 shows a single production stage 210. The production stage 210 includes a deploy function 222 that reads the modified software service build 201 from the release repository 232 and deploys the modified software service build 201 to a production space 228. The production space 228 may be one or more of the environments 108, 109, 111 of FIG. 1. In some examples, each of the environments 108, 109, 111 of FIG. 1 includes a production stage similar to production stage 210 and may separately execution all or part of the pipeline 200. Also, in some examples, the various deploy functions 214, 234, 218, 222 are executed using a deploy operations feature described by operations code of the build modified software service build 201.

The use of feature toggles and the operations stage 206 in the manner described may allow operations code to be considered in the sample pipeline 200 as applications code. Because modified operations features are toggled off until the modified operations code passes testing performed at the operations stage 206, risks to the remainder of the pipeline 200 from untested operations code modifications may be minimized.

Figure 3:
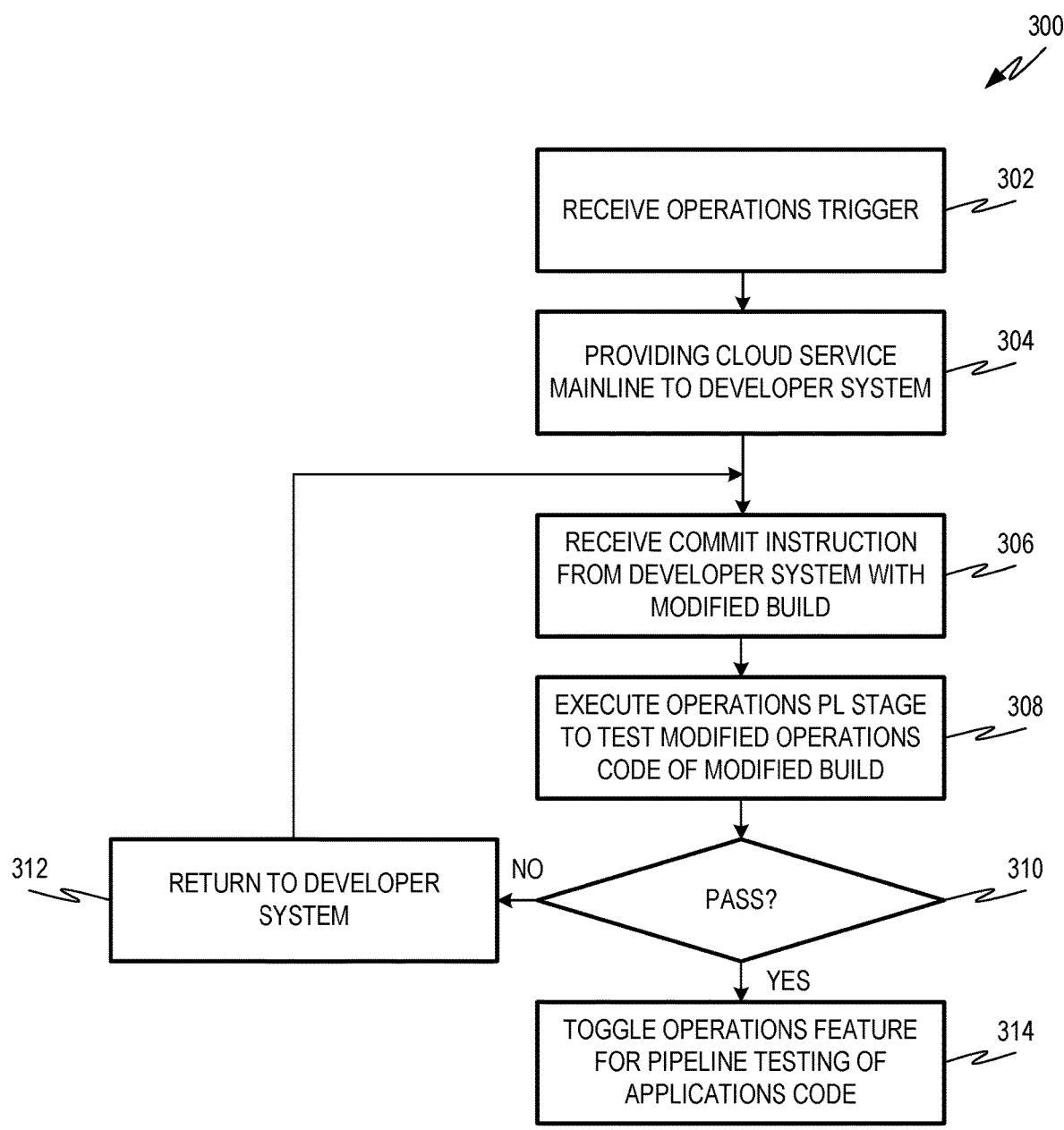
FIG. 3 is a flowchart showing one example of a process flow that may be executed in the example environment of FIG. 1 to process a modified software service build.

FIG. 3 is a flowchart showing one example of a process flow 300 that may be executed in the example environment 100 to process a modified software service build. At operation 302, a cloud service provider system receives an operations trigger requesting a change to operations code of a software service build. In some examples, the operations trigger is received from an ITSM, Configuration Management Database system, CIM system, event monitoring system, and/or the like.

In response to the trigger, the cloud service provider system 102, at operation 304, provides a version of the current mainline of the software service build to a developer to implement one or more modifications prompted by the operations trigger. The developer uses a version of the current mainline to generate modifications responsive to the operations trigger. For example, the modifications may include changes to operations code that implements one or more operations features.

At operation 306, the cloud service provider system 102 receives a commit instruction from the developer. The commit instruction may include the modifications to the mainline of the software service build. At operation 308, the cloud service provider system 102 executes an operations stage of a CI/CD pipeline to test the changes to the operations code. This can include, for example, building a modified software service build that has operations features toggled off and testing the operations features as described herein. If the modified software service build fails the testing at operation 310, the cloud service provider system 102 may return the modified software service build to the developer for further revisions at operation 312. Additional revisions may be provided by the developer with a commit instruction, as described with respect to operation 306. If the modified software service build passes the testing, the cloud service provider system 102 may toggle on the tested operations features at operation 314 and continue processing the modified software service build using the CI/CD pipeline as described herein.

Figure 4:
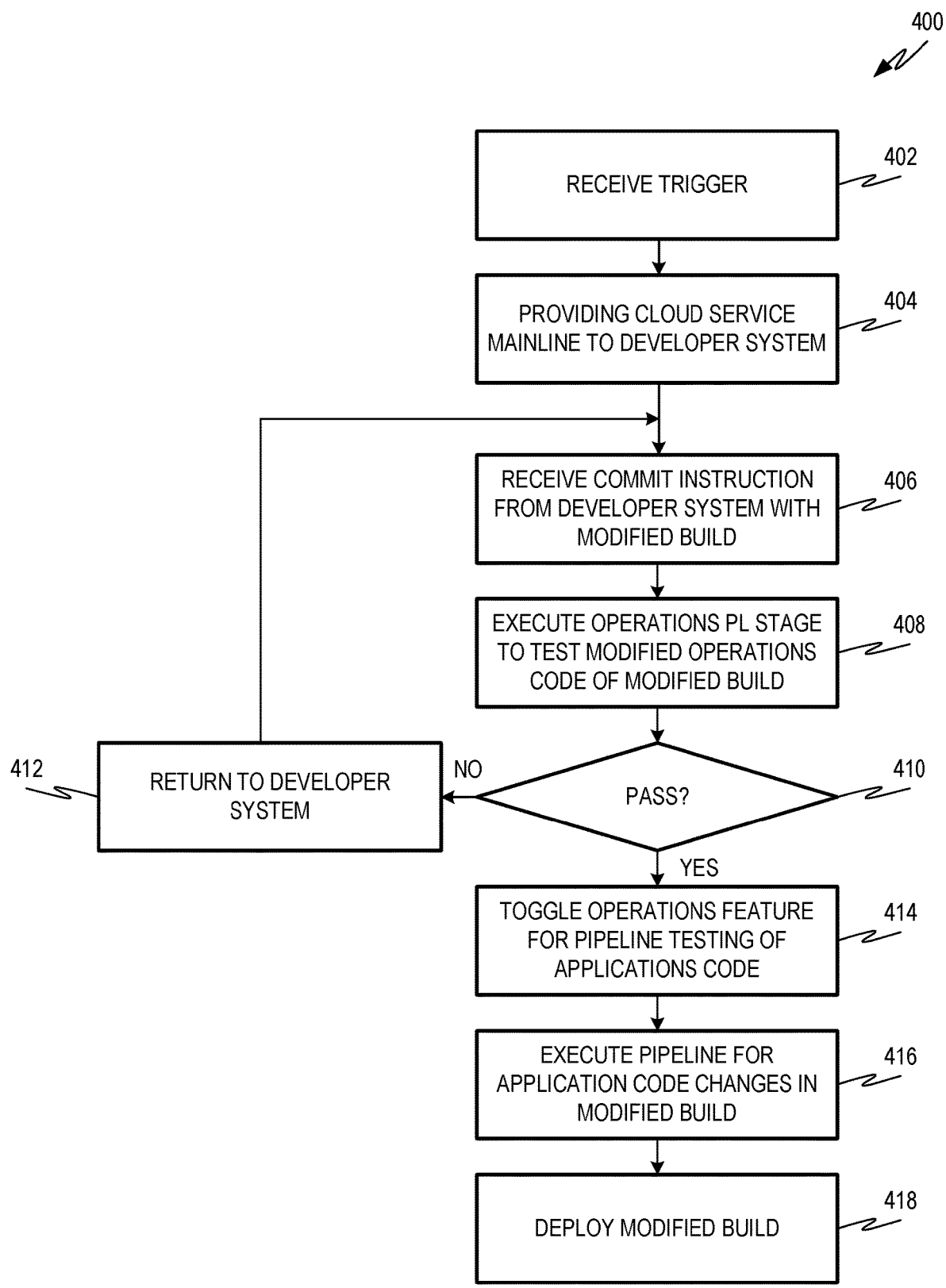
FIG. 4 is a flowchart showing one example of a process flow that may be executed in the example environment of FIG. 1 to process a modified software service build including a change to an operations feature and a change to an application feature.

In some examples, the cloud service provider system 102 receives a trigger that results in a change to both applications code and operations code for a software service build. FIG. 4 is a flowchart showing one example of a process flow 400 that may be executed in the environment 100 to process a modified software service build including a change to an operations feature and a change to an application feature. At operation 402, a cloud service provider system receives a trigger requesting a change to operations code of a software service build. In some examples, the operations trigger is received from a source code management system, an ITSM, Configuration Management Database system, CIM system, event monitoring system, and/or the like.

In response to the trigger, the cloud service provider system 102, at operation 404, provides a version of the current mainline of the software service build to a developer to implement one or more modifications prompted by the trigger. The developer uses version of the current mainline to generate modifications responsive to the trigger. For example, the modifications may include changes to operations code that implements one or more operations features.

At operation 406, the cloud service provider system 102 receives a commit instruction from the developer. The commit instruction may include the modifications to the mainline of the software service build. At operation 408, the cloud service provider system 102 executes an operations stage of a CI/CD pipeline to test the changes to the operations code. This can include, for example, building a modified software service build that has operations features toggled off and testing the operations features as described herein. If the modified software service build fails the testing at operation 410, the cloud service provider system 102 may return the modified software service build to the developer for further revisions at operation 412. The further revisions may be received and considered, for example, with a commit instruction as described with respect to operation 406.

If the modified software service build passes the testing, the cloud service provider system 102 may toggle on the tested operations features at operation 414 and continue processing the modified software service build using the CI/CD pipeline. At operation 416, the cloud service provider system 102 executes at least one pipeline stage for testing, integrating, and/or promoting application features such as, for example, an integration stage 207 or acceptance stage 208. After additional pipeline stages are passed, the cloud service provider system 102 may deploy the modified software service build at operation 418.

As described herein, directing operations triggers through a CI/CD pipeline can increase and, in some examples, significantly increase the number of deploy operations performed at the various environments 108, 109, 111. This can be addressed by implementing delta mode deploys. During a delta mode deploy, the cloud service provider system 102 executes only the portions of a deploy that are needed to implement the changes represented by a modified software service build. As described, this may include omitting some operations features of the deploy at some environments 108, 109, 111.

Figure 5:
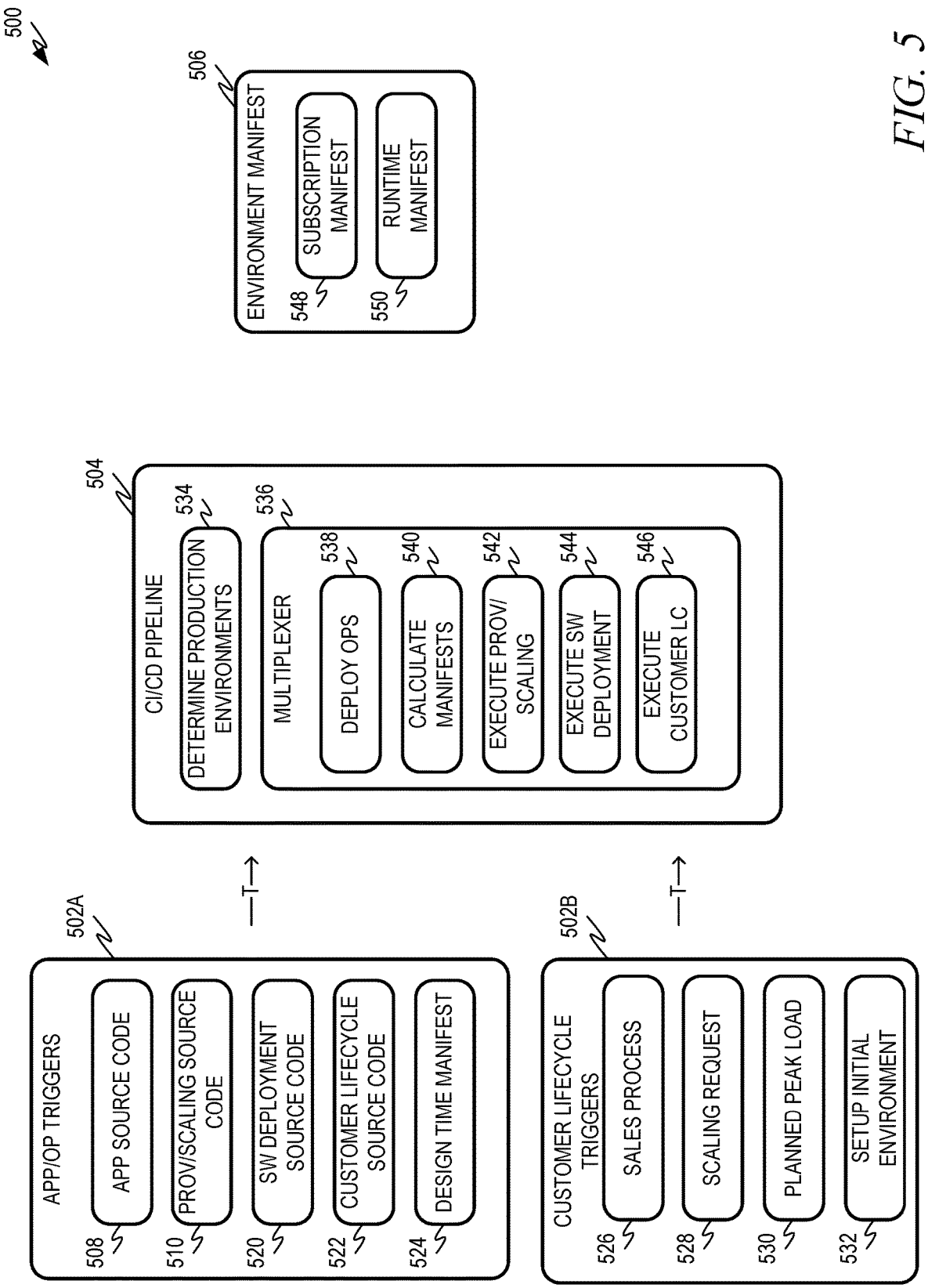
FIG. 5 is a diagram showing one example of a workflow for executing a delta mode deploy in the example environment of FIG. 1.

FIG. 5 is a diagram showing one example of a workflow 500 for executing a delta mode deploy in the example environment 100 of FIG. 1. The workflow 500 shows various example triggers 502A, 502B. Triggers 502A are application and/or operations triggers, for example, as described herein. Triggers 502A may lead to changes in applications code and/or operations code for the software service build. Triggers 502B are based on customer lifecycle events and may lead to changes in operations code for the software service build.

The triggers 502A, 502B are directed to a CI/CD pipeline 504. The CI/CD pipeline 504 may be executed at a cloud service provider system, such as the example cloud service provider system 102. In some examples, the CI/CD pipeline 504 includes deploy features that are implemented at the individual environments operating various customers of the software service. For example, the CI/CD pipeline 504 may include environment-executed features such as a determine production environments routine 534. The determine production environments routine 534 receives a modified software service build and determine the environments to which the modified software service build is to be deployed. Each environment may maintain environment manifests 506 including, for example, a subscription manifest 548 and a runtime manifest 550. Upon determining that a particular environment is to receive a modified software service build, the CI/CD pipeline 504 may include forwarding the modified software service build to the multiplexer 536 of the environments that are to receive the build.

A multiplexer 536 determines operations features that are to be executed at each environment that is to receive the modified software service build. For example, the multiplexer 536 may determine, for a given environment, whether various operations features 538, 540, 542, 544, 546, should be executed in response to a modified software service build. In some examples, the multiplexer may cause some features to a trial environment to allow users an opportunity to preview or test the features. In some examples, the multiplexer 536 sets the sequence of deploying builds to different environments. In some examples, the multiplexer 536 causes differential feature sets between environments by modulating feature toggles for builds deployed to different environments, as described in more detail herein. In this way, the same build may be deployed to different environments albeit with different features enabled.

A deploy operations feature 538 may be configured to deploy to an environment new operations code from a modified software service build. A calculate manifests feature 540 may calculate (or re-calculate) one or more of the environment's subscription manifest 548 and/or runtime manifest 550. An execute provisioning/scaling feature 542 may calculate (or re-calculate) the provisioning or scaling at the environment, for example, in view of the customers and users currently operated from the environment. An execution software deployment feature 544 may deploy new applications features of a modified software service build to the environment. An execute customer lifecycle feature 546 may execute a customer lifecycle routine that evaluates (or re-evaluates) the resources dedicated to a customer, for example, based on a customer lifecycle position.

Referring back to triggers 502A, consider an example application source code trigger 508. An application source code trigger 508 may prompt the creation of a modified software service build that includes changes to application code. For example, an application source code trigger 508 may be initiated by the source code management system 126, for example, in response to a request for a new application feature and/or for a change to an existing application feature from a customer, manager, or the like.

When the CI/CD pipeline 504 receives an application source code trigger 508, it may initiate a modified software service build based on the source code trigger 508. The modified software service build may be generated, for example, as described herein with respect to FIGS. 1 and 2. When the modified software service build is to be deployed, the determine production environments routine 534 is executed to determine which environments are to receive the modified software service build. The multiplexer 536 also executes to determine operations features 538, 540, 542, 544, 546 are to be executed at the respective environments. For an application source code trigger 508-generated modified software build, the execute software deployment feature 544 may be executed at each relevant environment. The execute software deployment feature 544 may utilize the runtime manifest 550 of each relevant environment, for example, to determine which resources at the environment are currently using the previous software service build and should be updated.

A provisioning/scaling source code trigger 510 may prompt the creation of a modified software service build that includes changes to operations code related to provisioning and scaling. The modified software service build may be generated, for example, as described herein with respect to FIGS. 1 and 2. When the modified software service build is to be deployed, the determine production environments routine 534 is executed to determine which environments are to receive the modified software service build. The multiplexer 536 also executes to determine operations features 538, 540, 542, 544, 546 are to be executed at the respective environments. For a modified software service build responsive to a provisioning/scaling source code trigger 510, the deploy operations feature 538 may be executed to deploy changes to the provisioning/scaling code. Also, due to changes to provisioning and scaling, the execute provisioning/scaling feature 542 may also be executed. If the re-running of the execute provisioning/scaling and/or execute software deployment feature 544 results in the need to execute a new deployment (e.g., at a new or different environment), then the execute software deployment feature 544 may also be executed.

A software development source code trigger 520 may prompt the creation of a modified software service build that includes changes to operations code and applications code. The modified software service build may be generated, for example, as described herein with respect to FIGS. 1 and 2. When the modified software service build is to be deployed, the determine production environments routine 534 is executed to determine which environments are to receive the modified software service build. The multiplexer 536 also executes to determine operations features 538, 540, 542, 544, 546 are to be executed at the respective environments. For a modified software service build responsive to a software development source code trigger 520, the deploy operations feature 538 may be executed to deploy the changes to the operations code. The execute software deployment feature 544 may be executed to deploy the changes to applications code. The execute software deployment feature 544 may utilize the runtime manifest 550, as described herein.

A customer lifecycle source code trigger 522 may prompt the creation of a modified software service build that includes changes to customer lifecycle code. The modified software service build may be generated, for example, as described herein with respect to FIGS. 1 and 2. When the modified software service build is to be deployed, the determine production environments routine 534 is executed to determine which environments are to receive the modified software service build. The multiplexer 536 also executes to determine operations features 538, 540, 542, 544, 546 are to be executed at the respective environments. For a modified software service build responsive to a customer lifecycle source code trigger 522, the deploy operations feature 538 may be executed to deploy the changes to the operations code. The execute customer lifecycle feature 546 is executed to calculate (or re-calculate) customer-lifecycle-related resource consumption by the various customers at the relevant environments. If the execution of the customer lifecycle feature results in a change to the provisioning or scaling at an environment, then the execute provisioning/scaling feature 542 may be executed to generate new provisioning/scaling at the environment. If new provisioning and/or scaling results in a change in resource allocation at the environment, then the calculate manifest feature 540 may be executed to calculate (or re-calculate) the manifests 548, 550 for the environment. If the change to provisioning results in a need to deploy a new environment, the execute software deployment feature 544 may be executed to perform this feature.

A design time manifest trigger 524 may prompt the creation of a modified software service build that includes changes to operations code and applications code. The modified software service build may be generated, for example, as described herein with respect to FIGS. 1 and 2. When the modified software service build is to be deployed, the determine production environments routine 534 is executed to determine which environments are to receive the modified software service build. The multiplexer 536 also executes to determine operations features 538, 540, 542, 544, 546 are to be executed at the respective environments. For a modified software service build responsive to a design time manifest trigger 524, the calculate manifest feature 540 executes to re-calculate the manifests 548, 550 in accordance with the new design time manifest. Also, the execute provisioning/scaling feature 542 may be executed to calculate (e.g., re-calculate) provisioning and scaling at the environment in accordance with the new design time manifest. If changes to provisioning and scaling are called for at an environment, the execute customer lifecycle feature 546 and/or execute software deployment feature 544 may be executed.

A lifecycle process trigger 526 may be generated, for example, based on a customer changing the terms of their use of the software service. For example, a lifecycle process trigger 526 may be generated when a customer purchases seats for additional users of the software service, purchases support for additional transactions, etc. When a lifecycle process trigger 526 is generated, the determine production environment routine 534 is executed to determine which environments are affected. The multiplexer 536 also executes to determine operations features 538, 540, 542, 544, 546 are to be executed at the respective environments. The execute customer lifecycle feature 546 may be executed to calculate or recalculate the customer resource needs based on the new lifecycle process trigger 526. The execute provisioning/scaling feature 542 may be executed to determine new provisioning and/or scaling based on the new lifecycle process trigger 526. If the new scaling and/or provisioning leads to the deployment of a new environment, the execute software deployment feature 544 may be executed to perform this task.

A scaling request trigger 528 may be generated, for example, based on a customer requesting more resources and/or fewer resources in one or more environment. For example, a scaling request trigger 528 may be generated when a customer claims that the software service is too slow and/or insufficiently responsive. When a scaling request trigger 528 is generated, the determine production environments routine 534 is executed to determine which environment or environments are affected. The multiplexer 536 also executes to determine operations features 538, 540, 542, 544, 546 are to be executed at the respective environments. The calculate manifest feature 540 executes to calculate new manifests based on the new scaling requested by the trigger 528. The execute provisioning/scaling feature 542 executes to implement the newly requested scaling. If the new scaling includes a change to customer lifecycle status (e.g., a purchase of additional seats, additional capacity, etc.), the customer lifecycle feature 546 may also be executed. If any change in scaling results in a need for a new environment, the execute software deployment feature 544 may be executed to implement the change.

A planned peak load trigger 530 may be generated, for example, when the cloud provider system determines that one or more customers are expected to experience a peak load on the software service higher than normal. Consider again the example in which the software service is an accounting service. A planned peak load may occur at a time of the year when the customer is expected to perform significantly more transactions, such as, for example, at a holiday. When a planned peak load trigger 530 is generated, the determine production environments routine 534 is executed to determine which environments are affected. The multiplexer 536 also executes to determine operations features 538, 540, 542, 544, 546 are to be executed at the respective environments. The calculate manifest feature 540 is executed to generate environment manifests 506 based on the planned peak load. Also, the provisioning/scaling feature 542 is executed to determine provisioning and/or scaling at the affected environment or environments to handle the planned peak load. If the new scaling and/or provisioning indicates a new environment, the execute software deployment feature 544 may be executed to create the new environment.

A setup initial environment trigger 532 may be generated, for example, when it is determined by the cloud service provider system (and/or by associated personnel) that it is desirable to generate a new environment. This may be done, for example, to preemptively prepare for sales in a geographic location of the environment, for peak load in the geographic location of the environment, etc. When a setup initial environment trigger 532 is generated, the determine production environments routine 534 is executed to determine which environments are affected. The multiplexer 536 also executes to determine operations features 538, 540, 542, 544, 546 are to be executed at the new environment. The calculate manifest feature 540 is executed to generate environment manifests 506 for the new environment. Also, the provisioning/scaling feature 542 is executed to determine provisioning and/or scaling at the new environment. The execute software deployment feature 544 may be executed to deploy the relevant software service build or builds to the new environment.

The provision of software services can also create challenges related to customer preference for features. For example, a cloud service provider system providing a software service may generate new application and/or operations code changes to a software service to add new features. Not all customers may desire to receive all of the features generated by the cloud service provider system, however. For example, a new software service feature may require a customer to update or modify the format of their data in order for the feature to execute properly. Also, in some examples, the customer may consume a software service for the purpose of providing a second software service to its own customers. In this way, the customers' own customers may not desire to have or use a new feature, for various reasons.

Customer's desire for different software service features can create complexities and difficulties for cloud service providers. For example, to actually provide different sets of preferred features for different customers, a cloud service provider may deploy different software service builds for different customers to different environments. This can create significant additional overhead for a cloud service provider, which would have to individually manage different versions of a software service build and different environments and even, in some examples, within the same environment.

In various examples, these and other issues can be addressed utilizing a single software build with feature toggles. As described, a feature toggle is a property of a software build that selectively enables or disables a feature or features. A cloud service provider may provide a single software service build to multiple environments, with different feature toggles set for different customers. The feature toggles may be selectively modified to deploy operations and/or applications features for customers as desired.

Feature toggles can be managed by a toggle routine. The toggle routine may execute at the cloud service provider system that generates a software service build and/or at the individual environments. In some examples, the toggle routine is a component of the software service build itself.

The toggle routine can be configured to modify the state of a feature toggle upon the occurrence of a toggle condition. The toggle condition may be, for example, the expiration of a time period, the enabling of another toggled feature, a customer request, and the like, as described herein.

Figure 6:
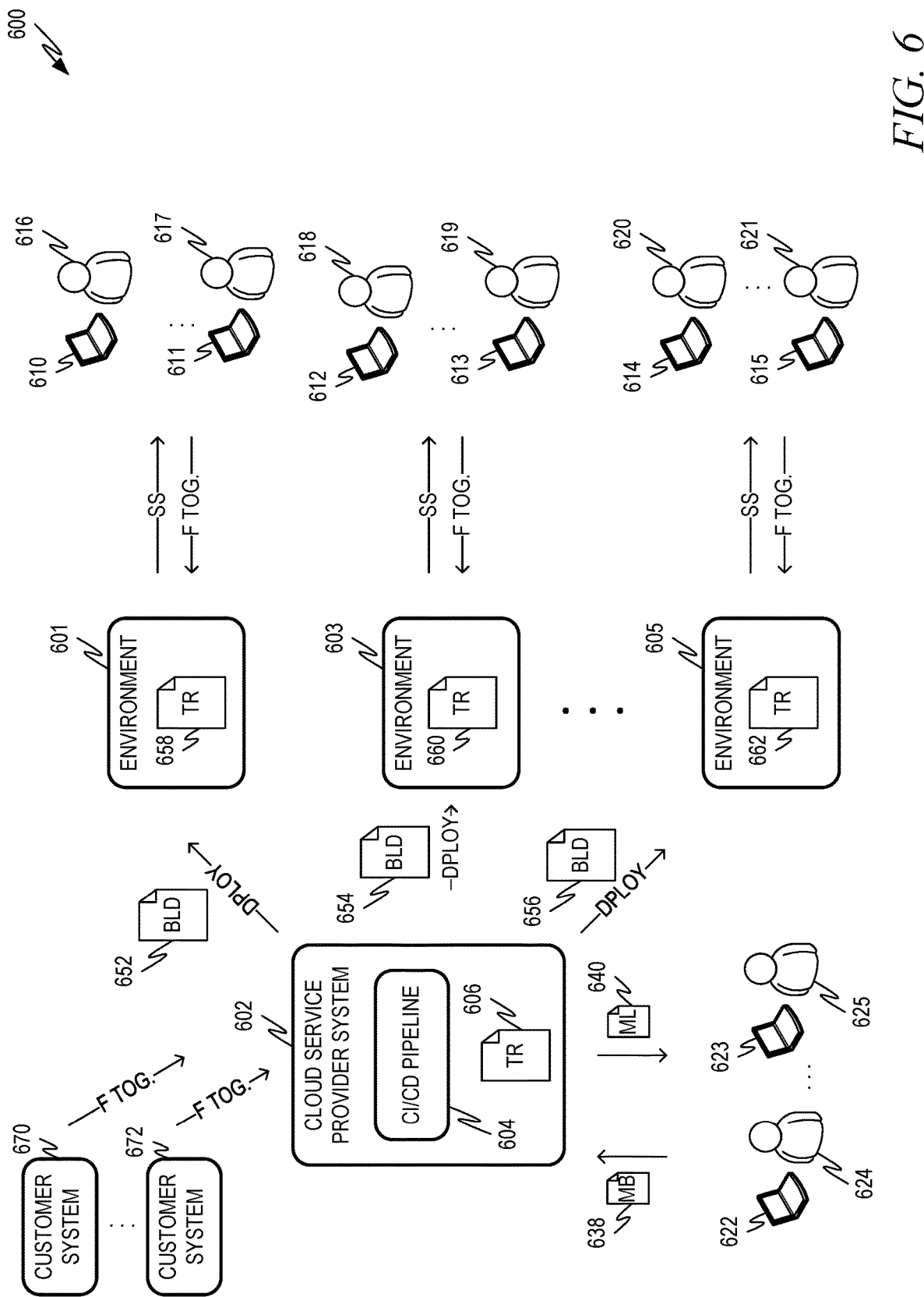
FIG. 6 is a diagram showing one example of an environment for providing a software service using feature toggles.

FIG. 6 is a diagram showing one example of an environment 600 for providing a software service using feature toggles. The environment 600 comprises a cloud service provider system 602 and various environments 601, 603, 605. The cloud service provider system 602 may be or include one or more computing devices, such as servers, that may be implemented by the cloud service provider and/or executed remotely.

Environments 601, 603, 605 execute software service builds 652, 654, 656. Software service builds 652, 654, 656 execute at the environments 601, 603, 605 to provide a software service, such as a cloud service, to one or more users 616, 617, 618, 619, 620, 621. The software service may be any suitable software service such as, for example, an IaaS, PaaS, and/or SaaS cloud service. In some examples, the software service is an SaaS cloud service provides an application to the users such as, for example, an accounting application, a human resources management application, a supply chain management application, etc.

Environments 601, 603, 605 may include one or more computing devices, such as servers, for executing the software service builds 652, 654, 656. In some examples, environments 601, 603, 605 are implemented at geographic locations near to their respective users 616, 617, 618, 619, 620, 621 so as to minimize network latencies as the users 616, 617, 618, 619, 620, 621 access the software service. For example, environment 601 may be implemented at a data center or data centers geographically near to the users 616, 617, environment 603 may be implemented at a data center or data centers geographically near to users 618, 619, environment 605 may be implemented at a data center or data centers geographically near to the users 620, 621, and so on.

Users 616, 617, 618, 619, 620, 621 consume the software service (indicated by the arrows labeled SS) utilizing one or more user computing devices 610, 611, 612, 613, 614, 615 that access the respective environments 601, 603, 605 utilizing a network, such as a Local Area Network (LAN), a Wide Area Network (WAN), etc. The user computing devices 610, 611, 612, 613, 614, 615 may be or include any sort of user computing device including, for example, a desktop computer, a laptop computer, a tablet computer, other mobile computing device, and the like.

Each user 616, 617, 618, 619, 620, 621 is associated with a customer, where the customer is an entity that receives access to the software service for its users. For example, a customer may be a business or other enterprise. The customer's users may include employees, contractors, or others who are authorized to access and use the software service on behalf of the customer. Customers may be operated out of one or more of the environments 601, 603, 605. A customer is operated out of an environment 601, 603, 605 when the customer's users 616, 617, 618, 619, 620, 621 access the software service via that environment 601, 603, 605. For example, if a first customer and a second customer are operated out of the environment 601, then a portion of the users 616, 617 of the environment 601 may be associated with the first customer and another portion of the users 616, 617 of the environment 601 may be associated with the second customer. (It will be appreciated that some environments 601, 603, 605 may provide software services to users from more than two customers.) The various environments 601, 603, 605 may be arranged to manage computing resources to adequately serve the users 616, 617, 618, 619, 620, 621 of customers operated out of a particular environment 601, 603, 605.

In some examples, the environment 600 also includes one or more customer systems 660, 662. Customer systems 660, 662 are associated with customers who obtain (e.g., purchase) the software service from a cloud service provider associated with the cloud service provider system 602. As described herein, a customer operating a customer system 660, 662 may be an enterprise that purchases access to the software service for users 616, 617, 618, 619, 620, 621 who are employees or otherwise associated with the enterprise. Also, as described herein, a customer may provide a second software service to users 616, 617, 618, 619, 620, 621, where the second software service consumes the first software service provided by the software service builds 652, 654, 656.

In this example, the customer systems 660, 662 may provide feature toggle messages (indicated by arrows labeled F TOG) to indicate that a toggled feature dependent on a selection by a customer is to be enabled. In some examples, such a selection from a customer may come from a user 616, 617, 618, 619, 620, 621 authorized to act on behalf of the customer. In other examples, such as when the users 616, 617, 618, 619, 620, 621 are consumers of a second service provided by the customer, the feature toggle messages F TOG may be provided by customer systems 660, 662. Also, although the feature toggle messages F TOG are provided to cloud service provider system 602, in some examples, customer systems 660, 662 provide feature toggle messages F TOG directly to the environment or environments 601, 603, 605 from which the respective customers are operated.

The software service builds 652, 654, 656 are generated using a cloud service provider system 602. The cloud service provider system 602 comprises a CI/CD pipeline 604 for generating the software service builds 652, 654, 656. The CI/CD pipeline 604 may comprise components for implementing application code and operations code, for example, as described herein. Also, although the CI/CD pipeline 604 is shown at the cloud service provider system 602, it will be appreciated that some portions of the CI/CD pipeline 604 may be implemented at the respective environments 601, 603, 605. For example, certain deployment, scaling, provisioning, and other aspects of the CI/CD pipeline 604 may be implemented at the respective environments 601, 603, 605 as described herein.

The cloud service provider system 602 is in communication with one or more developer users 624, 625 via one or more developer computing devices 622, 623. As described herein, developer users 624, 625 may check out a mainline 640 of the software service build. The developer user 624, 625 makes changes to the mainline 640, for example, to respond to a trigger. The developer commits a modified build 638, including the changes, to the cloud service provider system 602. The CI/CD pipeline 604 operates on the modified build 638 to perform various testing and integration on the modified build 638. Provided that the testing is successful, the modified build 638 is deployed to the environments 601, 603, 605 as a new build and/or to replace an existing build.

The software service builds 652, 654, 656 provided to the respective environments 601, 603, 605 may include at least one feature toggle, as described herein. In some examples, the cloud service provider system 602 generates the builds 652, 654, 656 with the feature toggles set to disable their corresponding features. The feature toggles may later be modified to enable the corresponding features upon the occurrence of a toggle condition, as described herein.

In some examples, the toggle condition is a user toggle message provided by one or more of the users 616, 617, 618, 619, 620, 621. For example, a user 616, 617, 618, 619, 620, 621 may determine to enable a feature of the software service that has been disabled by a feature toggle. In some examples, a customer 616, 617, 618, 619, 620, 621 providing a user toggle message may be a customer authorized to enable a feature by the corresponding customer.

In some examples, the toggle condition is a time. For example, the cloud service provider system 602 may configure a feature toggle to be disable a feature for a determined time period. The time period may, for example, provide the users 616, 617, 618, 619, 620, 621 (and associated customers) with sufficient time to make upgrades to data and/or other systems and/or to customer data in order to support the toggled feature.

In some examples, the toggle condition is a dependency on another toggled feature. For example, a first feature of the software service may depend on a second feature. Consider again the example in which the software service is an accounting solution. A feature providing updated purchase order processing may depend on an underlying feature modifying the structure of purchase orders. A feature toggle for the updated purchase order processing may be enabled when the underlying feature modifying purchase order structures is enabled.

The enabling of a toggled feature can be performed by a toggle routine. In some examples, a toggle routine 606 is executed at the cloud service provider system. The toggle routine 606 may monitor the software service builds 652, 654, 656 deployed to the various environments 601, 603, 605. When the toggle routine 606 determines that a toggle condition has occurred for one or more toggled features of a software service build 652, 654, 656, it may enable the relevant toggle at the build 652, 654, 656 installed at the relevant environment 601, 603, 605.

In some examples, the respective environments 601, 603, 605 execute toggle routines 658, 660, 662. The toggle routines 658, 660, 662 at the environments 601, 603, 605 monitor toggled features at the software service builds 652, 654, 656. When a toggle condition for a toggled feature is met, the toggle routines 658, 660, 662 at the environments 601, 603, 605 modify the relevant feature toggle to enable the relevant feature. In some examples, environment-executed toggle routines 658, 660, 662 are runtimes associated with respective software service builds 652, 654, 656.

In some examples, a toggled feature can be a mandatory new feature, an optional new feature or an incompatible change. A mandatory new feature is a new application and/or operations feature of a software service that the cloud service provider intends to be enabled at some point during the lifecycle of the software service build. An optional new feature is a feature that can be enabled at some point during the lifecycle of the software service build, for example, at the option of the provider, the customer, or the customer's users. An incompatible change is a new feature that is incompatible with another feature, another software service, and/or another application or service utilized by the customer and/or the customer's users.

In some examples, toggled feature activation is based on the type of new feature and the stage at which the feature is toggled, for example, as illustrated by the example of TABLE 1 below:

TABLE 1

| Feature Toggle | | Mandatory New Feature | | Optional New Feature | | Incompatible change | |
| --- | --- | --- | --- | --- | --- | --- | --- |
| Stage | Activation | UI/App | API | UI/App | API | UI/App | API |
| Provider | Immediately | X | X | X | X | — | — |
|  | Time Delayed | X | X | — | — | X | X |
|  | Dependent | X | X | X | X | X | X |
| Customer | Immediately | X | X | X | X | — | — |
|  | Time Delayed | (X) | (X) | X | X | (X) | (X) |
|  | Dependent | X | X | X | X | X | X |
| User | Immediately | X | — | X | — | — | — |
|  | Time Delayed | (X) | — | (X) | — | (X) | — |

TABLE 1 includes columns for mandatory new features, optional new features and incompatible changes along with a column for activation type and the stage at which a feature toggle is enabled. The stage of a feature toggle indicates when/where the feature toggle is set. For example, feature toggles set at the provider stage may be set in a manner that is environment independent (e.g., the same for all environments) or specific to a particular customer or customer group. Features set at the customer stage may be tenant independent (e.g., independent of tenancies held by the customer) or specific to a particular tenant. Feature toggles set at the user stage may apply to all similarly situated users and/or may be specific to a particular user or user group.

The activation type indicates the type of toggle condition that triggers a feature toggle to be modified to activate the feature. For example, the activation type "immediately" indicates that the feature is enabled when the software service build 652, 654, 656 is provided to the environments 601, 603, 605. For example, a feature that is activated immediately may have an associated feature toggle that is enabled on deployment or may not have an associated feature toggle at all.

An activation type of "time delayed" may indicate that a feature is to be activated by a higher stage until the expiration of a time period, as described herein. For example, a feature with a "time delayed" activation type may be activated by a higher-level stage only (e.g., provider, customer) only until the time period expires. After the time period expires, lower stages may activate the feature (e.g., customer, user). In some examples, the time period may change (e.g. shorten) for different stages in the dependency. Consider an example, feature with a time delayed activation type set at the provider level. The provider may activate the feature during a time period. After the time period has expired, lower level stages, such as customer and user stages, may activate the feature. In some examples, a feature with a time-delayed activation condition may cascade stages. For example, there may be a first time period during which the provider stage only can activate the feature. During a second time period, the customer stage only may activate the feature. After the second timer period, the user stage may activate the feature. In some examples, successive time periods may become shorter. For example, the second time period may be shorter than the first time period. (This is indicated in TABLE 1 by the X's that are in parentheses.)

An activation type of "dependent" indicates that the enablement of the feature depends on another action such as, for example, a request from the customer and/or the customer's users, the enablement of another feature, etc. For example, the feature may be activated upon the occurrence of the other event or action.

Consider an example of a mandatory new feature. The mandatory feature may be an applications feature, such as a user interface (UI) feature or other applications feature or, in this example, a feature related to the Application Programming Interface (API) of the software service build 652, 654, 656. Such a feature may be enabled immediately by the cloud service provider system 602, as described. It may be time delayed to a time period selected by the cloud service provider system 602. For example, the cloud service provider system 602 (or associated user) may select a time period after deployment of the software service build 652, 654, 656, the passage of which indicates the toggle condition for the feature. After the passage of the time period, all customers and/or associated users 616, 617, 618, 619, 620, 621 must have made any changes or updates for use of the feature. A mandatory feature may also be dependently delayed by the cloud service provider system 602. For example, the cloud service provider system 602 may set a feature toggle with a toggle condition that is dependent on, for example, a request from a customer or customer's user 616, 617, 618, 619, 620, 621, the deploying or enabling of another feature or application, etc.

In some examples, the activation or enablement of a mandatory new feature may also be determined by a customer. For example, the customer may provide the cloud service provider system 602 with an indication of the activation or enablement for the mandatory feature, which the cloud service provider system 602 then incorporates into the software service builds 652, 654, 656 for that customer and the user or users 616, 617, 618, 619, 620, 621 associated with that customer. In other examples, the customer may modify the relevant software service build 652, 654, 656 after it is deployed to the relevant environment 601, 603, 605.

In the example of TABLE 1, the customer may immediately enable a mandatory feature and/or may select that the mandatory feature be time delayed. The "time delayed" options for customer activation of a mandatory feature shown in TABLE 1 are in parentheses, which may indicate that the time delays selectable by a customer for a mandatory feature are constrained by the cloud service provider system 602. For example, a customer may not be able to delay the enablement of a mandatory feature beyond a maximum time period for the feature. In some examples, the customer may also configure a dependent enablement of a mandatory new feature.

In some examples, the activation or enablement of a mandatory new feature may also be determined by a user 616, 617, 618, 619, 620, 621. For example, where one or more of the users 616, 617, 618, 619, 620, 621 consume a service generated by one or more of the customers of the cloud service provider system 602, the users 616, 617, 618, 619, 620, 621 may provide input on feature activation. A user 616, 617, 618, 619, 620, 621 may determine the activation of a feature, for example, by informing the user's customer of the selection which is, in turn, provided to the cloud service provider system 602. In this example, a user 616, 617, 618, 619, 620, 621 may determine that a UI or other application feature should be activated immediately. The user 616, 617, 618, 619, 620, 621 may also determine that a UI or other application feature should be time delayed, for example, subject to a maximum time period for the delay indicated by the parentheses. In this example, the user 616, 617, 618, 619, 620, 621 may not be provided with the option to set the activation of an API feature.

In the example of TABLE 1, an optional new feature may be activated by the cloud service provider immediately or in a dependent manner, as described. In this example, the cloud service provider system 602 does not enable an optional new feature with a time delay, for example, because such an optional new feature is activated at the option of the customers and/or users 616, 617, 618, 619, 620, 621. A customer may have the option to activate or enable an optional new feature immediately, in a time-delayed manner or in a dependent manner, as described herein. Also, in this example, a user 616, 617, 618, 619, 620, 621 may have the option to activate an optional UI or other application feature immediately, or in a time-delayed manners (subject to a maximum time period). The user 616, 617, 618, 619, 620, 621 may not have the option to modify the activation of an API feature.

Figure 7:
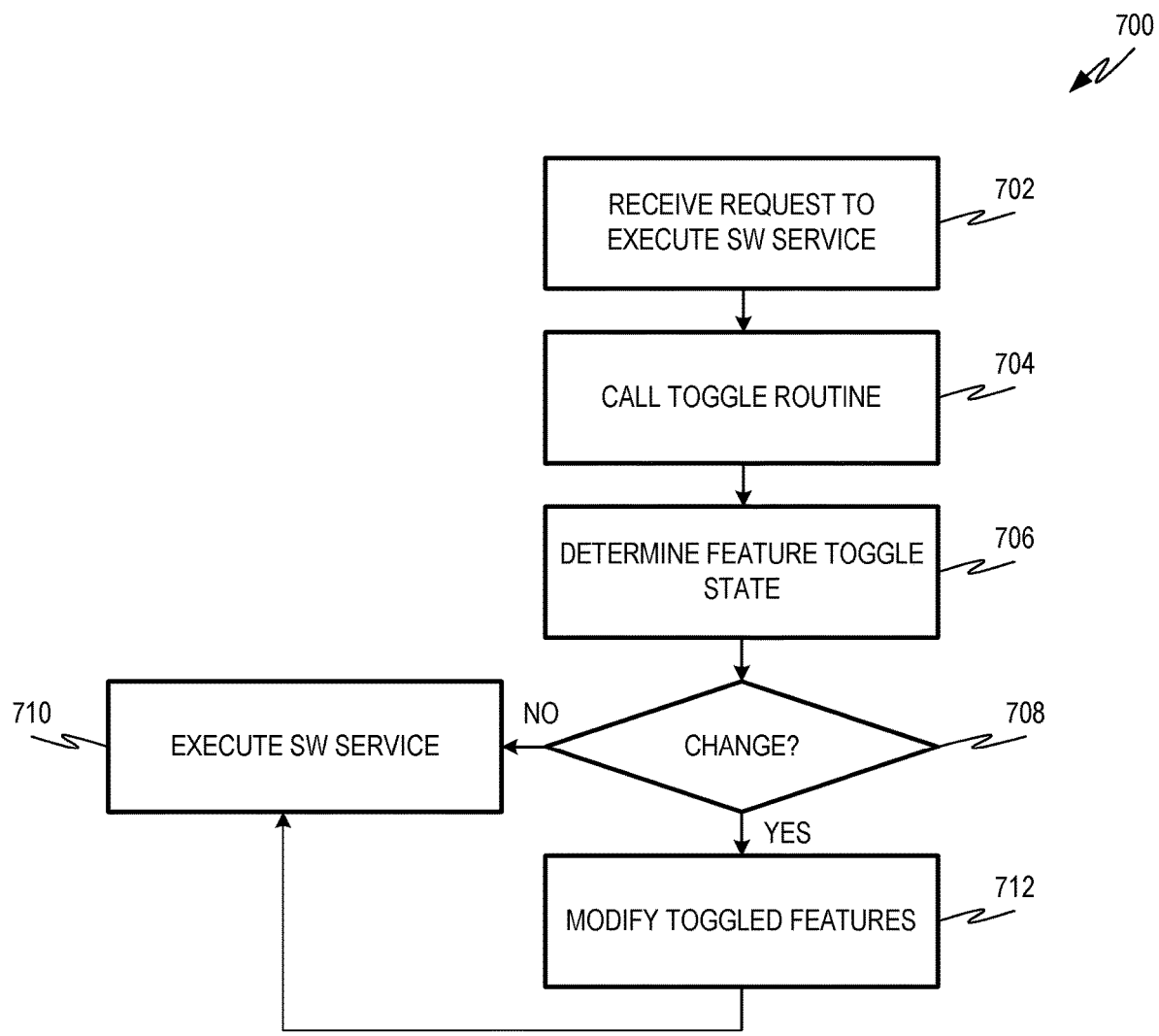
FIG. 7 is a flowchart showing one example of a process flow that can be executed in the example environment of FIG. 6 to utilize feature toggles in a software service build.

In the example of TABLE 1, an incompatible change may be activated by the cloud service provider system 602 in a time delayed manner and/or in a dependent manner (e.g., dependent on a toggle condition that occurs when a customer and/or user 616, 617, 618, 619, 620, 621 makes a change to their systems or data that creates compatibility for the change). In this example, the cloud service provider system 602 may not activate the incompatible change immediately. Similarly, in the example of TABLE 1, a customer may activate an incompatible change based on a time delay (e.g., subject to a maximum time period) and/or in a dependent manner. A user 616, 617, 618, 619, 620, 621 may determine the activation of an incompatible change to a UI or other application feature by setting a time delay (e.g., subject to a maximum time period). In this example, a user may not set an incompatible change to be enabled immediately and/or provide FIG. 7 is a flowchart showing one example of a process flow 700 that can be executed in the example environment 600 of FIG. 6 to utilize feature toggles in a software service build. The process flow 700 may be executed by a software service build 652, 654, 656 executing at an environment 601, 603, 605. At operation 702, the environment 601, 603, 605 receives a request (e.g., from a user 616, 617, 618, 619, 620, 621) to execute a software service.

At operation 704, a toggle routine is called. The toggle routine may be, for example, a feature of the software service build 652, 654, 656 itself. In some examples, the toggle routine is a separate toggle routine 658, 660, 662 executed at the environment 601, 603, 605. In other examples, the toggle routine is a toggle routine 606 executed at the cloud service provider system 602. Calling the toggle routine may include executing the toggle routine if it is not already executing. Calling the toggle routine may also include sending a message to the toggle routine indicating that the software service is to be executed.

At operation 706, the toggle routine determines the feature toggle state for one or more toggled features of the software service to be launched. At operation 708, the toggle routine determines if there is a change to the toggle state for the one or more toggled features of the software service. A change may occur, for example, if one or more toggle conditions for one or more of the toggled features has been met when that toggle condition was not met previously. If there is no change to the feature toggle state of the software service, the toggle routine instructs the environment 601, 603, 605 to execute the software service at operation 710. If there is a change to the feature toggle state of the software service, the toggle routine modifies one or more of the feature toggles for the software service at operation 712. This can include, for example, enabling one or more features. For example, if the change detected at operation 708 indicated that the toggle condition for a feature is met, then modifying the toggled features at 712 can include enabling that feature. After the toggled features are modified at operation 712, the toggle routine instructs the environment 601, 603, 605 to execute the software service at operation 710 (e.g., now with additional features enabled).

Figure 8:
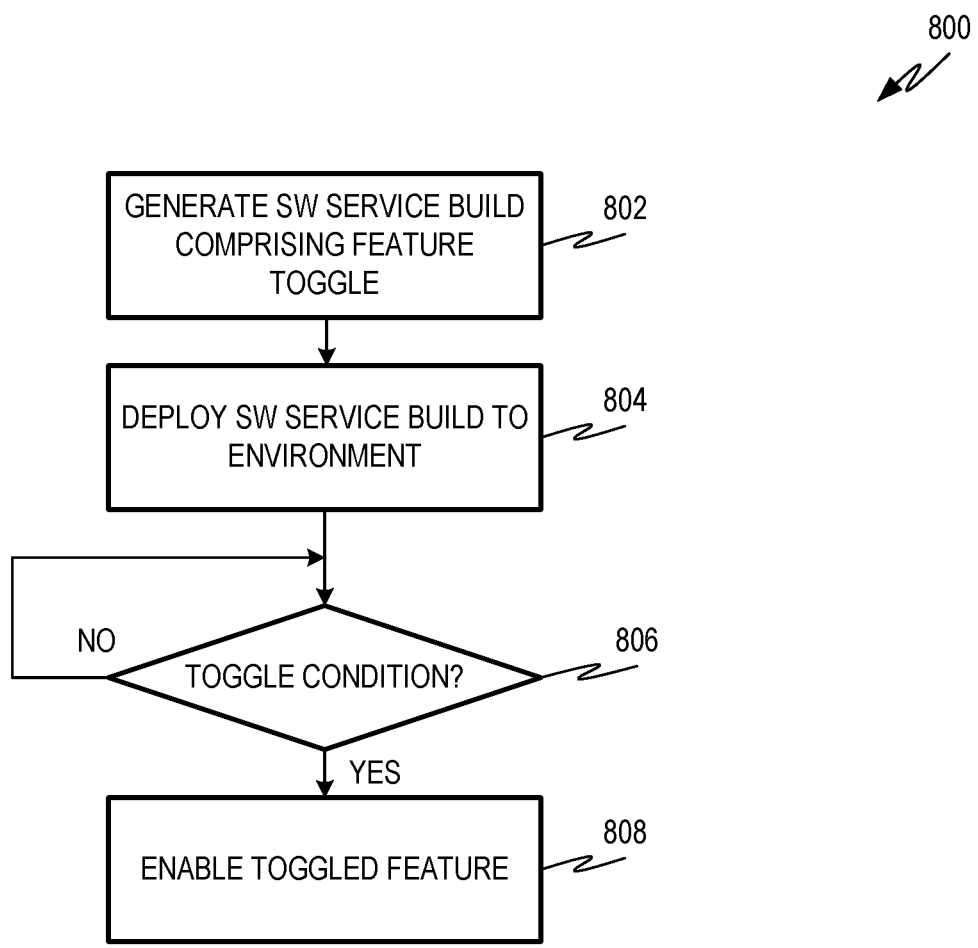
FIG. 8 is a flowchart showing one example of a process flow that can be executed in the example environment of FIG. 6 to implement feature toggles in a software service build.

FIG. 8 is a flowchart showing one example of a process flow 800 that can be executed in the example environment 600 of FIG. 6 to implement feature toggles in a software service build. At operation 802, the cloud service provider system 602 generates a software service build 652, 654, 656, for example, utilizing the CI/CD pipeline 604 as described herein. The software service build 652, 654, 656 includes one or more toggled features, for example, as described herein. The toggled features may be initially disabled and may be set to be enabled upon the occurrence of a toggle condition, as described herein. At operation 804, the cloud service provider system 602 deploys the software service build 652, 654, 656 to one or more environments 601, 603, 605, as described herein. For example, the deploy may also be part of the CI/CD pipeline 604.

At operation 806, a toggle routine determines whether a toggle condition for one or more of the toggled features for the software service build 652, 654, 656 is met. If no toggle conditions are met, the toggle routine may continue to periodically execute operation 806. If a toggle condition for one or more toggled features is met at operation 806, then the toggle routine enables the toggled feature corresponding to the met toggle condition at operation 808. If the toggle condition for more than one toggle feature was met at operation 806, then the toggle routine 606 enables more than one toggle feature at operation 808. After a toggle feature is enabled, the toggled feature may be available to users 616, 617, 618, 619, 620, 621 the next time that the software service build 652, 654, 656 is executed. In some examples, if less than all of the toggled features of a software service build 652, 654, 656 are enabled at operation 808, the toggle routine may continue to periodically execute operation 806 until all toggled features for a software service build 652, 654, 656 are enabled at operation 808.

The toggle routine executing operations 806 and 808 of the process flow 800 may be the toggle routine 606 executing at the cloud service provider system 602. In some examples, the toggle routine executing operations 806 and 808 of the process flow 800 is a toggle routine 658, 660, 662 executing at the respective environments 601, 603, 605. In some examples, the toggle routine executing operations 806 and 808 is a routine that is a component of the respective software service builds 652, 654, 656.

Figure 9:
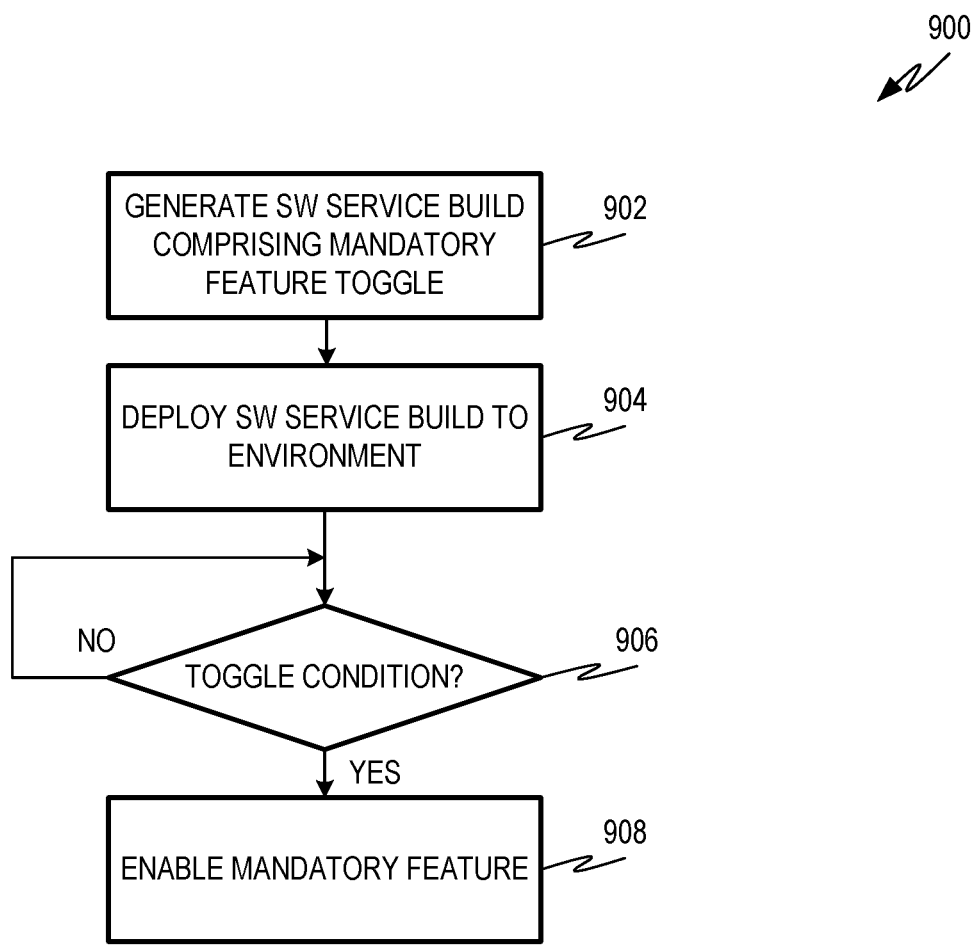
FIG. 9 is a flowchart showing one example of a process flow that can be executed in the example environment of FIG. 6 to implement feature toggles in a software service build for a mandatory feature.

FIG. 9 is a flowchart showing one example of a process flow 900 that can be executed in the example environment 600 of FIG. 6 to implement feature toggles in a software service build for a mandatory feature. At operation 902, the cloud service provider system 602 generates a software service build 652, 654, 656, for example, utilizing the CI/CD pipeline 604 as described herein. The software service build 652, 654, 656 includes at least one mandatory feature. The mandatory feature may be toggled by a feature toggle and may be initially disabled. The feature toggle of the mandatory feature may be configured to enable the mandatory feature upon the occurrence of a toggle condition, such as a time period as described herein. At operation 904, the cloud service provider system 602 deploys the software service build 652, 654, 656 to one or more environments 601, 603, 605, as described herein. For example, the deploy may also be part of the CI/CD pipeline 604.

At operation 906, a toggle routine determines whether the toggle condition for the mandatory feature is met. The toggle condition for the mandatory feature may be, for example, a time period and/or a dependency determined by the cloud service provider system 602 at build-time. In some examples, the toggle condition is a time period and/or dependency determined by a customer. Also, in some examples, (e.g., for mandatory features that are UI or other application features), the toggle condition can be a time period set by a user 616, 617, 618, 619, 620, 621.

If the toggle condition is not met, the toggle routine may continue to periodically execute operation 906. If the toggle condition is met at operation 906, then the toggle routine enables the mandatory feature at operation 908. After the mandatory feature is enabled, it may be available to users 616, 617, 618, 619, 620, 621 the next time that the software service build 652, 654, 656 is executed.

The toggle routine executing operations 906 and 908 of the process flow 900 may be the toggle routine 606 executing at the cloud service provider system 602. In some examples, the toggle routine executing operations 906 and 908 of the process flow 900 is a toggle routine 658, 660, 662 executing at the respective environments 601, 603, 605. In some examples, the toggle routine executing operations 906 and 908 is a routine that is a component of the respective software service builds 652, 654, 656.

Figure 10:
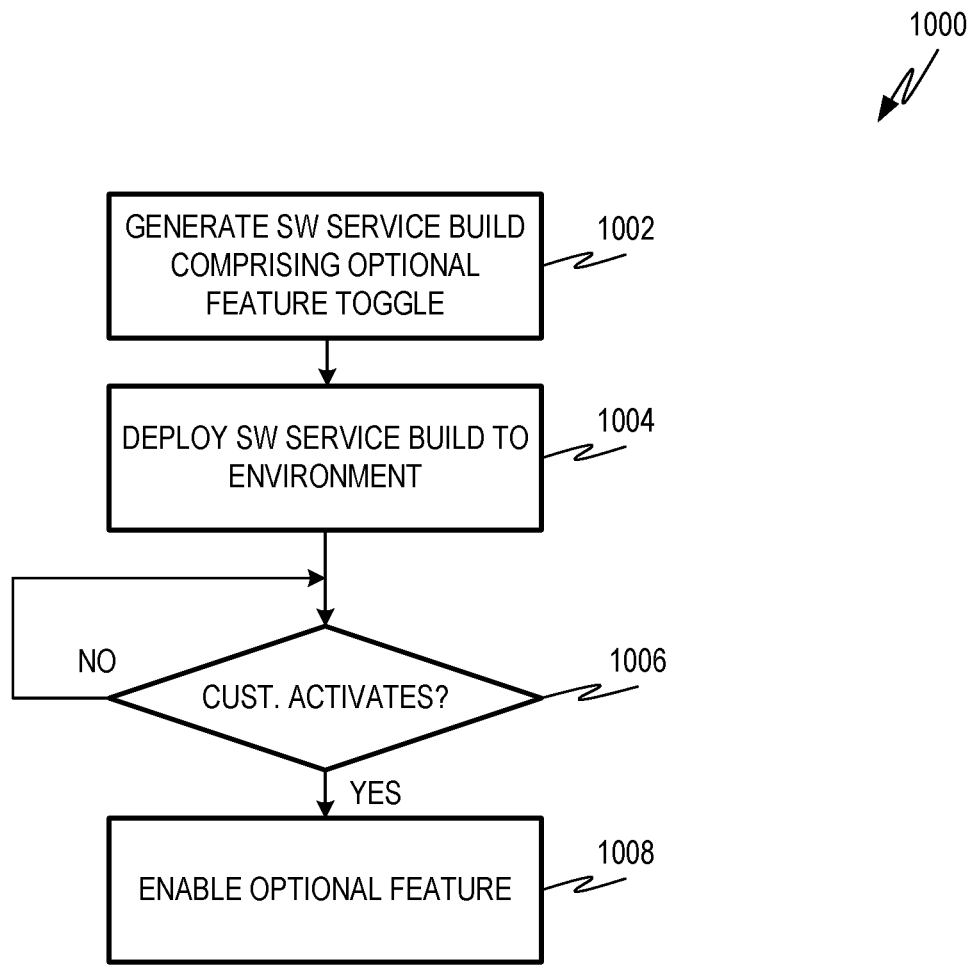
FIG. 10 is a flowchart showing one example of a process flow that can be executed in the example environment of FIG. 6 to implement feature toggles in a software service build for an optional feature.

FIG. 10 is a flowchart showing one example of a process flow 1000 that can be executed in the example environment 600 of FIG. 6 to implement feature toggles in a software service build for an optional feature. At operation 1002, the cloud service provider system 602 generates a software service build 652, 654, 656, for example, utilizing the CI/CD pipeline 604 as described herein. The software service build 652, 654, 656 includes at least one optional feature. The optional feature may be toggled by a feature toggle and may be initially disabled. The feature toggle of the optional feature may be configured to enable the optional feature upon the occurrence of a toggle condition. At operation 1004, the cloud service provider system 602 deploys the software service build 652, 654, 656 to one or more environments 601, 603, 605, as described herein. For example, the deploy may also be part of the CI/CD pipeline 604.

At operation 1006, a toggle routine determines whether the toggle condition for the optional feature is met. The toggle condition for the optional feature may be, for example, a time period and/or a dependency determined by the cloud service provider system 602 at build-time. In some examples, the toggle condition is a time period and/or dependency determined by a customer. Also, in some examples, (e.g., for optional features that are UI or other application features), the toggle condition can be a time period set by a user 616, 617, 618, 619, 620, 621.

If the toggle condition is not met, the toggle routine may continue to periodically execute operation 1006. If the toggle condition is met at operation 1006, then the toggle routine enables the optional feature at operation 1008. After the optional feature is enabled, it may be available to users 616, 617, 618, 619, 620, 621 the next time that the software service build 652, 654, 656 is executed.

The toggle routine executing operations 1006 and 1008 of the process flow 1000 may be the toggle routine 606 executing at the cloud service provider system 602. In some examples, the toggle routine executing operations 1006 and 1008 of the process flow 1000 is a toggle routine 658, 660, 662 executing at the respective environments 601, 603, 605. In some examples, the toggle routine executing operations 1006 and 1008 is a routine that is a component of the respective software service builds 652, 654, 656.

Figure 11:
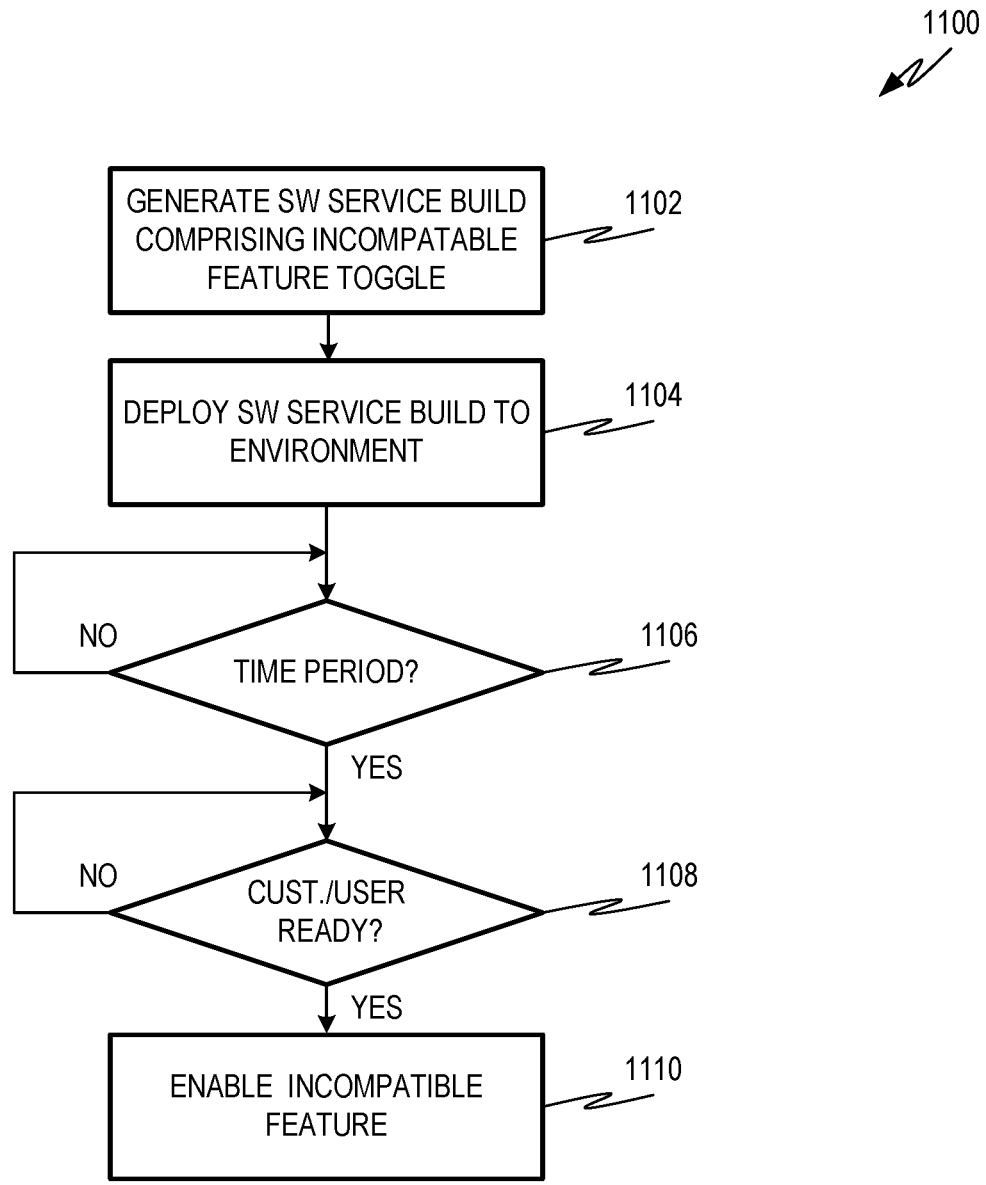
FIG. 11 is a flowchart showing one example of a process flow that can be executed in the example environment of FIG. 6 to implement feature toggles in a software service build for an optional feature.

FIG. 11 is a flowchart showing one example of a process flow 1100 that can be executed in the example environment 600 of FIG. 6 to implement feature toggles in a software service build for an optional feature. At operation 1102, the cloud service provider system 602 generates a software service build 652, 654, 656, for example, utilizing the CI/CD pipeline 604 as described herein. The software service build 652, 654, 656 includes at least one feature that is an incompatible change. The incompatible change feature may be toggled by a feature toggle and may be initially disabled. The feature toggle of the incompatible change feature may be configured to enable the feature upon the occurrence of a toggle condition. In this example, the incompatible change feature is configured with two toggle conditions: a time period (operation 1106) and a customer dependency (operation 1108). It will be appreciated that some toggled features other than incompatible changes may also be configured with multiple toggle conditions. It will also be appreciated that some incompatible change features may be configured with a single toggle condition.

At operation 1104, the cloud service provider system 602 deploys the software service build 652, 654, 656 to one or more environments 601, 603, 605, as described herein. For example, the deploy may also be part of the CI/CD pipeline 604. At operation 1106, a toggle routine determines whether a time period toggle condition for the incompatible change feature has been met. If the time period has not passed, the toggle routine may continue to periodically execute the operation 1106. If the time period has passed, the toggle routine determines, at operation 1108, whether the customer and/or user is ready for activation or enabling of the incompatible change. This can include, for example, checking a status of the customer and/or users' system or systems to determine if software incompatible with the incompatible change feature has been modified to achieve compatibility. Also, in some examples, it may include determining whether a customer and/or user has provided a message indicating that it is ready for the incompatible change feature to be activated.

If the toggle routine does not determine that the customer and/or user is ready for the incompatible change feature to be enabled at operation 1108, it may periodically re-execute the operation 1108. Upon determining that the customer and/or user is ready for the incompatible feature change, the toggle routine enables the incompatible feature change at operation 1110.

The toggle routine executing operations 1106, 1108, and 1110 of the process flow 1100 may be the toggle routine 606 executing at the cloud service provider system 602. In some examples, the toggle routine executing operations 1106, 1108, and 1110 of the process flow 1100 is a toggle routine 658, 660, 662 executing at the respective environments 601, 603, 605. In some examples, the toggle routine executing operations 1106, 1108, and 1110 is a routine that is a component of the respective software service builds 652, 654, 656.

In view of the disclosure above, various examples are set forth below. It should be noted that one or more features of an example, taken in isolation or combination, should be considered within the disclosure of this application.

EXAMPLES

Example 1 is a system for providing software services to one or more consumer systems, the system comprising: at least one hardware processor programmed to perform operations comprising: receiving an operations trigger describing a desired change to the software service; providing a software service mainline to a first developer system; receiving, from the first developer system, a commit instruction including a modified build of the software service, the modified build comprising at least one change to operations code of the software service, the change to the operations code of the software service comprising a change to a first operations feature of the software service; using the modified build, performing at least one test of the operations code of the software service at an operations stage of the system; responsive to the at least one test of the operations code, setting a feature toggle for the first operations feature to enable the change to the operations code of the software service; executing at least one applications test stage to test the modified build, the executing of the test stage comprising executing the first operations feature of the software service using the change to the operations code of the software service; and responsive to a result of the test of the modified build, deploying the modified build to a first environment.

In Example 2, the subject matter of Example 1 optionally includes the modified build also comprising at least one change to application code of the software service.

In Example 3, the subject matter of any one or more of Examples 1-2 optionally includes the operations further comprising: using a subscription manifest of the first environment and at least one scaling rule, determining that the deploying of the modified build to the first environment will not change a scaling of the software service at the first environment; and executing the deploying of the modified build while omitting a scaling routine for the first environment.

In Example 4, the subject matter of any one or more of Examples 2-3 optionally includes the deploying of the modified build comprising: determining that the at least one change to the application code of the software service is not implemented at the first environment; and executing a software deployment routine at the first environment to deploy the at least one change to the application code of the software service at the first environment.

In Example 5, the subject matter of any one or more of Examples 1-4 optionally includes the change to the operations code of the software service comprising a change to scaling code for scaling the software service, the deploying of the modified build comprising: executing a scaling routine for the first environment to determine a modified scaling of the first environment for the modified build of the software service; determining that the modified scaling of the first environment is not adequate for a first set of customers operated from the first environment; and executing a new environment deploy routine to deploy a new environment to operate at least one of the first set of customers.

In Example 6, the subject matter of any one or more of Examples 1-5 optionally includes the change to the operations code of the software service comprising a change to a scaling rule for the software service, the deploying of the modified build comprising: calculating a modified subscription manifest for the first environment using the change to the scaling rule; using the modified subscription manifest, determining that a modified scaling of the first environment is not adequate for a first set of customers operated from the first environment; and executing a new environment deploy routine to deploy a new environment to operate at least one of the first set of customers.

In Example 7, the subject matter of any one or more of Examples 1-6 optionally includes the operations trigger a change to a lifecycle process associated with a first customer operated from the first environment, the operations further comprising: determining that the first customer is operated from the first environment; and based at least in part on determining that the first customer is operated from the first environment, determining to execute the deploying of the modified build to the first environment.

In Example 8, the subject matter of any one or more of Examples 1-7 optionally includes the operations trigger indicating a planned peak load associated with a first customer operated from the first environment, the operations further comprising: using the planned peak load for the first customer, executing a scaling routine for the first environment to determine a modified scaling of the first environment for the modified build of the software service; determining that the modified scaling of the first environment is not adequate for a first set of customers operated from the first environment, the first set of customers comprising the first customer; and executing a new environment deploy routine to deploy a new environment to operate at least one of the first set of customers.

Example 9 is a method for providing software services to one or more consumer systems, the method comprising: receiving, by a cloud service provider system, an operations trigger describing a desired change to a software service; providing, by the cloud service provider system, a software service mainline to a first developer system associated with the cloud service provider system; receiving, from the first developer system, a commit instruction including a modified build of the software service, the modified build comprising at least one change to operations code of the software service, the change to the operations code of the software service comprising a change to a first operations feature of the software service; using the modified build, performing at least one test of the operations code of the software service at an operations stage; responsive to the at least one test of the operations code, setting a feature toggle for the first operations feature to enable the change to the operations code of the software service; executing at least one applications test stage to test the modified build, the executing of the test stage comprising executing the first operations feature of the software service using the change to the operations code of the software service; and responsive to a result of the test of the modified build, deploying the modified build to a first environment.

In Example 10, the subject matter of Example 9 optionally includes the modified build also comprising at least one change to application code of the software service.

In Example 11, the subject matter of any one or more of Examples 9-10 optionally includes using a subscription manifest of the first environment and at least one scaling rule, determining that the deploying of the modified build to the first environment will not change a scaling of the software service at the first environment; and executing the deploying of the modified build while omitting a scaling routine for the first environment.

In Example 12, the subject matter of any one or more of Examples 10-11 optionally includes the deploying of the modified build comprising: determining that the at least one change to the application code of the software service is not implemented at the first environment; and executing a software deployment routine at the first environment to deploy the at least one change to the application code of the software service at the first environment.

In Example 13, the subject matter of any one or more of Examples 9-12 optionally includes the change to the operations code of the software service comprising a change to scaling code for scaling the software service, the deploying of the modified build comprising: executing a scaling routine for the first environment to determine a modified scaling of the first environment for the modified build of the software service; determining that the modified scaling of the first environment is not adequate for a first set of customers operated from the first environment; and executing a new environment deploy routine to deploy a new environment to operate at least one of the first set of customers.

In Example 14, the subject matter of any one or more of Examples 9-13 optionally includes the change to the operations code of the software service comprising a change to a scaling rule for the software service, the deploying of the modified build comprising: calculating a modified subscription manifest for the first environment using the change to the scaling rule; using the modified subscription manifest, determining that a modified scaling of the first environment is not adequate for a first set of customers operated from the first environment; and executing a new environment deploy routine to deploy a new environment to operate at least one of the first set of customers.

In Example 15, the subject matter of any one or more of Examples 9-14 optionally includes the operations trigger a change to a lifecycle process associated with a first customer operated from the first environment, the method further comprising: determining that the first customer is operated from the first environment; and based at least in part on determining that the first customer is operated from the first environment, determining to execute the deploying of the modified build to the first environment.

In Example 16, the subject matter of any one or more of Examples 9-15 optionally includes the operations trigger indicating a planned peak load associated with a first customer operated from the first environment, the method further comprising: using the planned peak load for the first customer, executing a scaling routine for the first environment to determine a modified scaling of the first environment for the modified build of the software service; determining that the modified scaling of the first environment is not adequate for a first set of customers operated from the first environment, the first set of customers comprising the first customer; and executing a new environment deploy routine to deploy a new environment to operate at least one of the first set of customers.

Example 17 is a non-transitory machine-readable medium comprising instructions thereon that, when executed by at least one hardware processor, cause the at least one hardware processor to perform operations comprising: receiving an operations trigger describing a desired change to a software service; providing a software service mainline to a first developer system; receiving, from the first developer system, a commit instruction including a modified build of the software service, the modified build comprising at least one change to operations code of the software service, the change to the operations code of the software service comprising a change to a first operations feature of the software service; using the modified build, performing at least one test of the operations code of the software service at an operations stage of the system; responsive to the at least one test of the operations code, setting a feature toggle for the first operations feature to enable the change to the operations code of the software service; executing at least one applications test stage to test the modified build, the executing of the test stage comprising executing the first operations feature of the software service using the change to the operations code of the software service; and responsive to a result of the test of the modified build, deploying the modified build to a first environment.

In Example 18, the subject matter of Example 17 optionally includes the modified build also comprising at least one change to application code of the software service.

In Example 19, the subject matter of any one or more of Examples 17-18 optionally includes the operations further comprising: using a subscription manifest of the first environment and at least one scaling rule, determining that the deploying of the modified build to the first environment will not change a scaling of the software service at the first environment; and executing the deploying of the modified build while omitting a scaling routine for the first environment.

In Example 20, the subject matter of any one or more of Examples 18-19 optionally includes the deploying of the modified build comprising: determining that the at least one change to the application code of the software service is not implemented at the first environment; and executing a software deployment routine at the first environment to deploy the at least one change to the application code of the software service at the first environment.

Figure 12:
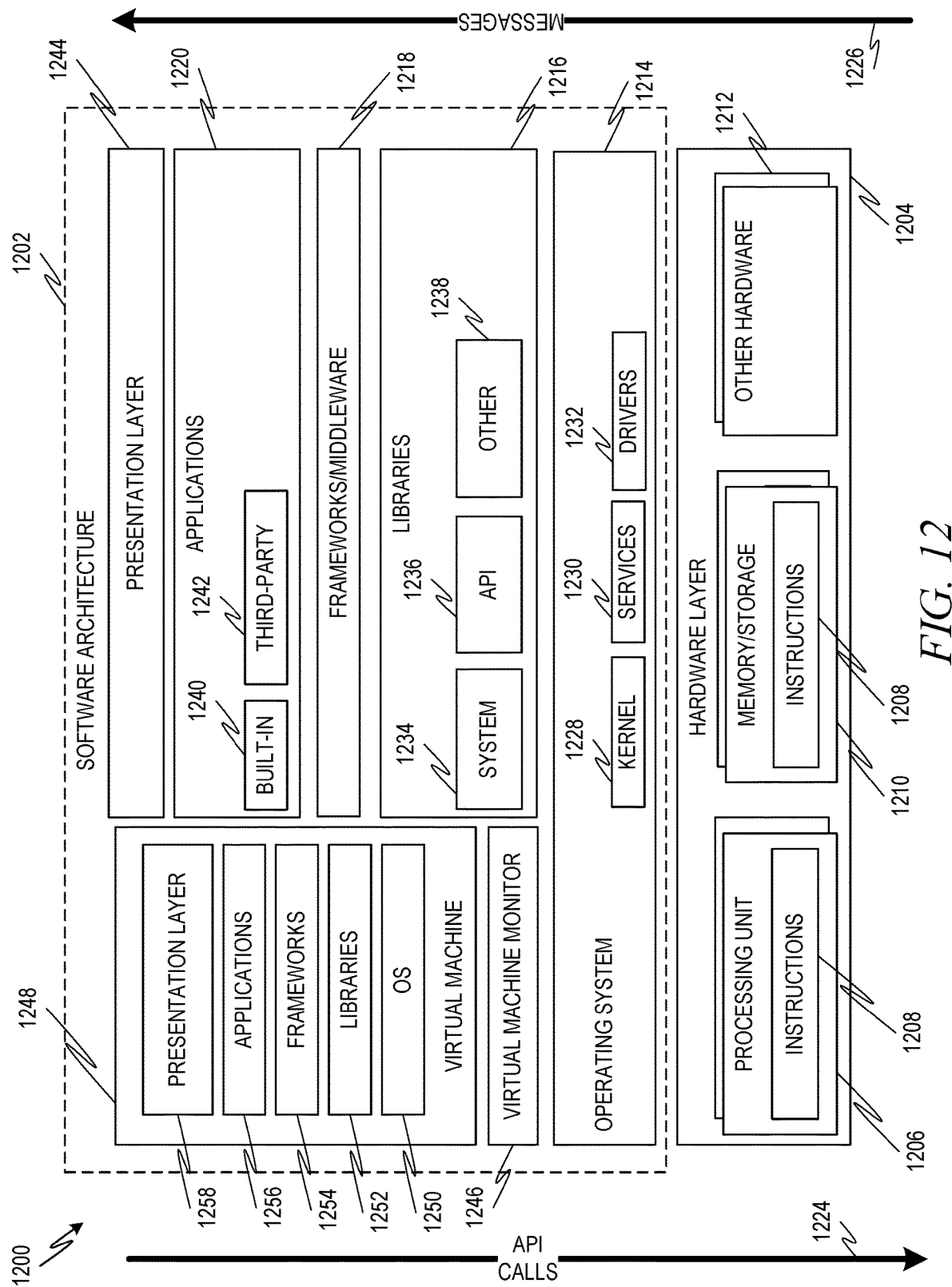
FIG. 12 is a block diagram showing one example of a software architecture for a computing device.

FIG. 12 is a block diagram 1200 showing one example of a software architecture 1202 for a computing device. The architecture 1202 may be used in conjunction with various hardware architectures, for example, as described herein. FIG. 12 is merely a non-limiting example of a software architecture and many other architectures may be implemented to facilitate the functionality described herein. The software architecture 1202 and various other components described in FIG. 12 may be used to implement various other systems described herein. For example, the software architecture 1202 shows one example way for implementing a cloud service provider system 102, environment 108, computing devices 110, 103, 112, 113, 114, 115 or other computing devices described herein.

In FIG. 12, A representative hardware layer 1204 is illustrated and can represent, for example, any of the above referenced computing devices. In some examples, the hardware layer 1204 may be implemented according to the architecture of the computer system of FIG. 12.

The representative hardware layer 1204 comprises one or more processing units 1206 having associated executable instructions 1208. Executable instructions 1208 represent the executable instructions of the software architecture 1202, including implementation of the methods, modules, subsystems, and components, and so forth described herein and may also include memory and/or storage modules 1210, which also have executable instructions 1208. Hardware layer 1204 may also comprise other hardware as indicated by other hardware 1212 which represents any other hardware of the hardware layer 1204, such as the other hardware illustrated as part of the architecture 1202.

In the example architecture of FIG. 12, the software architecture 1202 may be conceptualized as a stack of layers where each layer provides particular functionality. For example, the software architecture 1202 may include layers such as an operating system 1214, libraries 1216, frameworks/middleware 1218, applications 1220, and presentation layer 1244. Operationally, the applications 1220 and/or other components within the layers may invoke API calls 1224 through the software stack and access a response, returned values, and so forth illustrated as messages 1226 in response to the API calls 1224. The layers illustrated are representative in nature and not all software architectures have all layers. For example, some mobile or special purpose operating systems may not provide a frameworks/middleware layer 1218, while others may provide such a layer. Other software architectures may include additional or different layers.

The operating system 1214 may manage hardware resources and provide common services. The operating system 1214 may include, for example, a kernel 1228, services 1230, and drivers 1232. The kernel 1228 may act as an abstraction layer between the hardware and the other software layers. For example, the kernel 1228 may be responsible for memory management, processor management (e.g., scheduling), component management, networking, security settings, and so on. The services 1230 may provide other common services for the other software layers. In some examples, the services 1230 include an interrupt service. The interrupt service may detect the receipt of an interrupt and, in response, cause the architecture 1202 to pause its current processing and execute an interrupt service routine (ISR) when an interrupt is accessed.

The drivers 1232 may be responsible for controlling or interfacing with the underlying hardware. For instance, the drivers 1232 may include display drivers, camera drivers, Bluetooth® drivers, flash memory drivers, serial communication drivers (e.g., Universal Serial Bus (USB) drivers), Wi-Fi® drivers, NFC drivers, audio drivers, power management drivers, and so forth depending on the hardware configuration.

The libraries 1216 may provide a common infrastructure that may be utilized by the applications 1220 and/or other components and/or layers. The libraries 1216 typically provide functionality that allows other software modules to perform tasks in an easier fashion than to interface directly with the underlying operating system 1214 functionality (e.g., kernel 1228, services 1230 and/or drivers 1232). The libraries 1216 may include system 1234 libraries (e.g., C standard library) that may provide functions such as memory allocation functions, string manipulation functions, mathematic functions, and the like. In addition, the libraries 1216 may include API libraries 1236 such as media libraries (e.g., libraries to support presentation and manipulation of various media format such as MPEG4, H.264, MP3, AAC, AMR, JPG, PNG), graphics libraries (e.g., an OpenGL framework that may be used to render 2D and 3D in a graphic content on a display), database libraries (e.g., SQLite that may provide various relational database functions), web libraries (e.g., WebKit that may provide web browsing functionality), and the like. The libraries 1216 may also include a wide variety of other libraries 1238 to provide many other APIs to the applications 1220 and other software components/modules.

The frameworks 1218 (also sometimes referred to as middleware) may provide a higher-level common infrastructure that may be utilized by the applications 1220 and/or other software components/modules. For example, the frameworks 1218 may provide various graphic user interface (GUI) functions, high-level resource management, high-level location services, and so forth. The frameworks 1218 may provide a broad spectrum of other APIs that may be utilized by the applications 1220 and/or other software components/modules, some of which may be specific to a particular operating system or platform.

The applications 1220 include built-in applications 1240 and/or third-party applications 1242. Examples of representative built-in applications 1240 may include, but are not limited to, a contacts application, a browser application, a book reader application, a location application, a media application, a messaging application, and/or a game application. Third-party applications 1242 may include any of the built-in 1240 applications as well as a broad assortment of other applications. In a specific example, the third-party application 1242 (e.g., an application developed using the Android™ or iOS™ software development kit (SDK) by an entity other than the vendor of the particular platform) may be mobile software running on a mobile operating system such as iOS™, Android™, Windows® Phone, or other mobile computing device operating systems. In this example, the third-party application 1242 may invoke the API calls 1224 provided by the mobile operating system such as operating system 1214 to facilitate functionality described herein.

The applications 1220 may utilize built-in operating system functions (e.g., kernel 1228, services 1230 and/or drivers 1232), libraries (e.g., system 1234, APIs 1236, and other libraries 1238), and frameworks/middleware 1218 to create user interfaces to interact with users of the system. Alternatively, or additionally, in some systems interactions with a user may occur through a presentation layer, such as presentation layer 1244. In these systems, the application/module "logic" can be separated from the aspects of the application/module that interact with a user.

Some software architectures utilize virtual machines. For example, the various environments described herein, such as environments 108, 109, 111, may implement one or more virtual machines executing to provide the software service. In some examples, the users 116, 117, 118, 119, 120, 121 of a given customer use a virtual machine dedicated to that customer. The example of FIG. 12 illustrates by virtual machine 1248. A virtual machine creates a software environment where applications/modules can execute as if they were executing on a hardware computing device. A virtual machine 1248 is hosted by a host operating system (operating system 1214) and typically, although not always, has a virtual machine monitor 1246, which manages the operation of the virtual machine 1248 as well as the interface with the host operating system (i.e., operating system 1214). A software architecture executes within the virtual machine 1248 such as an operating system 1250, libraries 1252, frameworks/middleware 1254, applications 1256 and/or presentation layer 1258. These layers of software architecture executing within the virtual machine 1248 can be the same as corresponding layers previously described or may be different.

Certain embodiments are described herein as including logic or a number of components, modules, or mechanisms. Modules may constitute either software modules (e.g., code embodied (1) on a non-transitory machine-readable medium or (2) in a transmission signal) or hardware-implemented modules. A hardware-implemented module is a tangible unit capable of performing certain operations and may be configured or arranged in a certain manner. In example embodiments, one or more computer systems (e.g., a standalone, client, or server computer system) or one or more hardware processors may be configured by software (e.g., an application or application portion) as a hardware-implemented module that operates to perform certain operations as described herein.

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment, or a server farm), while in other embodiments the processors may be distributed across a number of locations.

Example embodiments may be implemented in digital electronic circuitry, or in computer hardware, firmware, or software, or in combinations of them. Example embodiments may be implemented using a computer program product, e.g., a computer program tangibly embodied in an information carrier, e.g., in a machine-readable medium for execution by, or to control the operation of, data processing apparatus, e.g., a programmable processor, a computer, or multiple computers.

Computer software, including code for implementing software services can be written in any form of programming language, including compiled or interpreted languages, and it can be deployed in any form, including as a standalone program or as a module, subroutine, or other unit suitable for use in a computing environment. Computer software can be deployed to be executed on one computer or on multiple computers at one site or distributed across multiple sites and interconnected by a communication network.

In example embodiments, operations may be performed by one or more programmable processors executing a computer program to perform functions by operating on input data and generating output.

Figure 13:
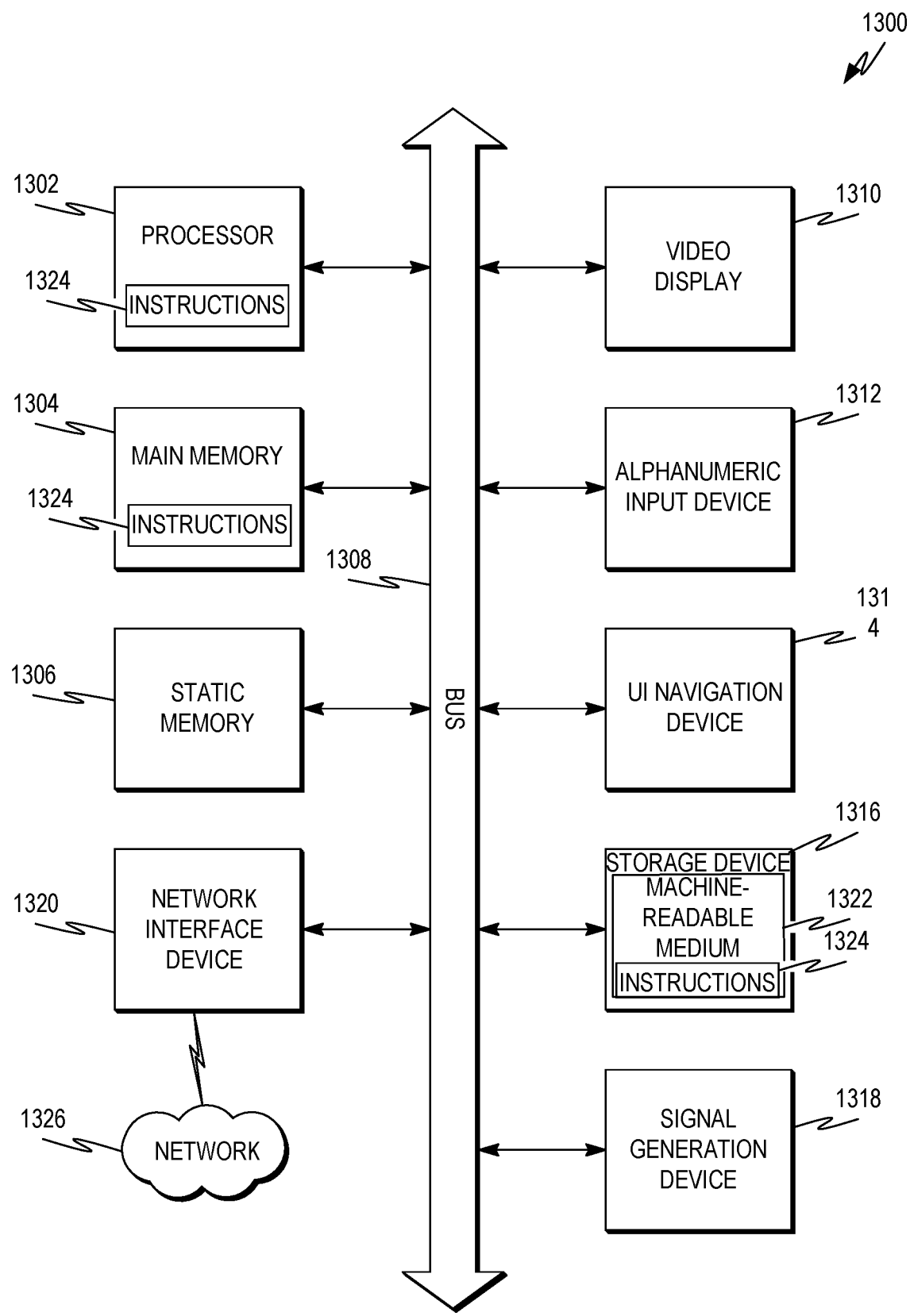
FIG. 13 is a block diagram of a machine in the example form of a computer system within which instructions may be executed for causing the machine to perform any one or more of the methodologies discussed herein.

FIG. 13 is a block diagram of a machine in the example form of a computer system 1300 within which instructions 1324 may be executed for causing the machine to perform any one or more of the methodologies discussed herein. For example, the computer system 1300 shows one example implementation that can be used for any of the computing devices shown in the environments 100, 200, 500, 600 or otherwise described herein. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed)

network environment. The machine may be a personal computer (PC), a tablet PC, a set-top box (STB), a personal digital assistant (PDA), a cellular telephone, a web appliance, a network router, switch, or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1300 includes a processor 1302 (e.g., a central processing unit (CPU), a graphics processing unit (GPU), or both), a main memory 1304, and a static memory 1306, which communicate with each other via a bus 1308. The computer system 1300 may further include a video display unit 1310 (e.g., a liquid crystal display (LCD) or a cathode ray tube (CRT)). The computer system 1300 also includes an alphanumeric input device 1312 (e.g., a keyboard or a touch-sensitive display screen), a user interface (UI) navigation (or cursor control) device 1314 (e.g., a mouse), a disk drive unit 1316, a signal generation device 1318 (e.g., a speaker), and a network interface device 1320.

The disk drive unit 1316 includes a machine-readable medium 1322 on which is stored one or more sets of data structures and instructions 1324 (e.g., software) embodying or utilized by any one or more of the methodologies or functions described herein. The instructions 1324 may also reside, completely or at least partially, within the main memory 1304 and/or within the processor 1302 during execution thereof by the computer system 1300, with the main memory 1304 and the processor 1302 also constituting machine-readable media 1322.

While the machine-readable medium 1322 is shown in an example embodiment to be a single medium, the term "machine-readable medium" may include a single medium or multiple media (e.g., a centralized or distributed database, and/or associated caches and servers) that store the one or more instructions 1324 or data structures. The term "machine-readable medium" shall also be taken to include any tangible medium that is capable of storing, encoding, or carrying instructions 1324 for execution by the machine and that cause the machine to perform any one or more of the methodologies of the present disclosure, or that is capable of storing, encoding, or carrying data structures utilized by or associated with such instructions 1324. The term "machine-readable medium" shall accordingly be taken to include, but not be limited to, solid-state memories, and optical and magnetic media. Specific examples of machine-readable media 1322 include non-volatile memory, including by way of example semiconductor memory devices, e.g., erasable programmable read-only memory (EPROM), electrically erasable programmable read-only memory (EEPROM), and flash memory devices; magnetic disks such as internal hard disks and removable disks; magneto-optical disks; and CD-ROM and DVD-ROM disks.

The instructions 1324 may further be transmitted or received over a communications network 1326 using a transmission medium. The instructions 1324 may be transmitted using the network interface device 1320 and any one of a number of well-known transfer protocols (e.g., HTTP). Examples of communication networks include a local area network (LAN), a wide area network (WAN), the Internet, mobile telephone networks, plain old telephone (POTS) networks, and wireless data networks (e.g., WiFi and WiMax networks). The term "transmission medium" shall be taken to include any intangible medium that is capable of storing, encoding, or carrying instructions 1324 for execution by the machine, and includes digital or analog communications signals or other intangible media to facilitate communication of such software.

Although an embodiment has been described with reference to specific example embodiments, it will be evident that various modifications and changes may be made to these embodiments without departing from the broader spirit and scope of the disclosure. Accordingly, the specification and drawings are to be regarded in an illustrative rather than a restrictive sense. The accompanying drawings that form a part hereof show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

What is claimed is:

1. A method for providing a software service to one or more consumer systems, the method comprising:

receiving, by a cloud service provider system, an operations trigger describing a desired change to a software service;

providing, by the cloud service provider system, a software service mainline to a first developer system associated with the cloud service provider system, the software service mainline comprising code to execute a version of the software service, the code comprising operations code and application code;

receiving, from the first developer system, a commit instruction including a modified build of the software service, the modified build being based on the software service mainline and comprising at least one change to operations code relative to the software service mainline, the at least one change to the operations code of the software service comprising a change to a first operations feature of the software service;

using the modified build, performing at least one test of the operations code of the software service at an operations stage;

responsive to the at least one test of the operations code, setting a feature toggle for the first operations feature to enable the at least one change to the operations code of the software service;

executing at least one applications test stage to test the modified build, the executing of the at least one applications test stage comprising executing the first operations feature of the software service using the at least one change to the operations code of the software service; and responsive to a result of the at least one applications test stage, deploying the modified build to a first environment.

2. The method of claim 1, the modified build also comprising at least one change to application code of the software service.

3. The method of claim 1, further comprising:
using a subscription manifest of the first environment and at least one scaling rule, determining that the deploying of the modified build to the first environment will not change a scaling of the software service at the first environment; and
executing the deploying of the modified build while omitting a scaling routine for the first environment.

4. The method of claim 2, the deploying of the modified build comprising:
determining that the at least one change to the application code of the software service is not implemented at the first environment; and
executing a software deployment routine at the first environment to deploy the at least one change to the application code of the software service at the first environment.

5. The method of claim 1, the at least one change to the operations code of the software service comprising a change to scaling code for scaling the software service, the deploying of the modified build comprising:
executing a scaling routine for the first environment to determine a modified scaling of the first environment for the modified build of the software service;
determining that the modified scaling of the first environment is not adequate for a first set of customers operated from the first environment; and
executing a new environment deploy routine to deploy a new environment to operate at least one of the first set of customers.

6. The method of claim 1, the at least one change to the operations code of the software service comprising a change to a scaling rule for the software service, the deploying of the modified build comprising:
calculating a modified subscription manifest for the first environment using the at least one change to the scaling rule;
using the modified subscription manifest, determining that a modified scaling of the first environment is not adequate for a first set of customers operated from the first environment; and
executing a new environment deploy routine to deploy a new environment to operate at least one of the first set of customers.

7. The method of claim 1, the operations trigger a change to a lifecycle process associated with a first customer operated from the first environment, the method further comprising:
determining that the first customer is operated from the first environment; and
based at least in part on determining that the first customer is operated from the first environment, determining to execute the deploying of the modified build to the first environment.

8. The method of claim 1, the operations trigger indicating a planned peak load associated with a first customer operated from the first environment, the method further comprising:
using the planned peak load for the first customer, executing a scaling routine for the first environment to determine a modified scaling of the first environment for the modified build of the software service;
determining that the modified scaling of the first environment is not adequate for a first set of customers operated from the first environment, the first set of customers comprising the first customer; and
executing a new environment deploy routine to deploy a new environment to operate at least one of the first set of customers.

9. A system for providing a software service to one or more consumer systems, the system comprising:
at least one hardware processor programmed to perform operations comprising:
receiving an operations trigger describing a desired change to the software service;
providing a software service mainline to a first developer system, the software service mainline comprising code to execute a version of the software service, the code comprising operations code and application code;
receiving, from the first developer system, a commit instruction including a modified build of the software service, the modified build being based on the software service mainline and comprising at least one change to operations code relative to the software service mainline, the at least one change to the operations code of the software service comprising a change to a first operations feature of the software service;
using the modified build, performing at least one test of the operations code of the software service at an operations stage of the system;
responsive to the at least one test of the operations code, setting a feature toggle for the first operations feature to enable the at least one change to the operations code of the software service;
executing at least one applications test stage to test the modified build, the executing of the at least one applications test stage comprising executing the first operations feature of the software service using the at least one change to the operations code of the software service; and
responsive to a result of the at least one applications test stage, deploying the modified build to a first environment.

10. The system of claim 9, the modified build also comprising at least one change to application code of the software service.

11. The system of claim 9, the operations further comprising:
using a subscription manifest of the first environment and at least one scaling rule, determining that the deploying of the modified build to the first environment will not change a scaling of the software service at the first environment; and
executing the deploying of the modified build while omitting a scaling routine for the first environment.

12. The system of claim 10, the deploying of the modified build comprising:
determining that the at least one change to the application code of the software service is not implemented at the first environment; and
executing a software deployment routine at the first environment to deploy the at least one change to the application code of the software service at the first environment.

13. The system of claim 9, the at least one change to the operations code of the software service comprising a change to scaling code for scaling the software service, the deploying of the modified build comprising:
- executing a scaling routine for the first environment to determine a modified scaling of the first environment for the modified build of the software service;
- determining that the modified scaling of the first environment is not adequate for a first set of customers operated from the first environment; and
- executing a new environment deploy routine to deploy a new environment to operate at least one of the first set of customers.

14. The system of claim 9, the at least one change to the operations code of the software service comprising a change to a scaling rule for the software service, the deploying of the modified build comprising:
- calculating a modified subscription manifest for the first environment using the at least one change to the scaling rule;
- using the modified subscription manifest, determining that a modified scaling of the first environment is not adequate for a first set of customers operated from the first environment; and
- executing a new environment deploy routine to deploy a new environment to operate at least one of the first set of customers.

15. The system of claim 9, the operations trigger a change to a lifecycle process associated with a first customer operated from the first environment, the operations further comprising:
- determining that the first customer is operated from the first environment; and
- based at least in part on determining that the first customer is operated from the first environment, determining to execute the deploying of the modified build to the first environment.

16. The system of claim 9, the operations trigger indicating a planned peak load associated with a first customer operated from the first environment, the operations further comprising:
- using the planned peak load for the first customer, executing a scaling routine for the first environment to determine a modified scaling of the first environment for the modified build of the software service;
- determining that the modified scaling of the first environment is not adequate for a first set of customers operated from the first environment, the first set of customers comprising the first customer; and
- executing a new environment deploy routine to deploy a new environment to operate at least one of the first set of customers.

17. A non-transitory machine-readable medium comprising instructions thereon that, when executed by at least one hardware processor, cause the at least one hardware processor to perform operations comprising:
- receiving an operations trigger describing a desired change to a software service;
- providing a software service mainline to a first developer system, the software service mainline comprising code to execute a version of the software service, the code comprising operations code and application code;
- receiving, from the first developer system, a commit instruction including a modified build of the software service, the modified build being based on the software service mainline and comprising at least one change to operations code relative to the software service mainline, the at least one change to the operations code of the software service comprising a change to a first operations feature of the software service;
- using the modified build, performing at least one test of the operations code of the software service at an operations stage of the system;
- responsive to the at least one test of the operations code, setting a feature toggle for the first operations feature to enable the at least one change to the operations code of the software service;
- executing at least one applications test stage to test the modified build, the executing of the at least one applications test stage comprising executing the first operations feature of the software service using the at least one change to the operations code of the software service; and
- responsive to a result of the at least one applications test stage, deploying the modified build to a first environment.

18. The medium of claim 17, the modified build also comprising at least one change to application code of the software service.

19. The medium of claim 17, the operations further comprising:
- using a subscription manifest of the first environment and at least one scaling rule, determining that the deploying of the modified build to the first environment will not change a scaling of the software service at the first environment; and
- executing the deploying of the modified build while omitting a scaling routine for the first environment.

20. The medium of claim 18, the deploying of the modified build comprising:
- determining that the at least one change to the application code of the software service is not implemented at the first environment; and
- executing a software deployment routine at the first environment to deploy the at least one change to the application code of the software service at the first environment.

* * * * *